United States Patent [19]

Pooser et al.

[11] Patent Number: 5,812,134
[45] Date of Patent: Sep. 22, 1998

[54] USER INTERFACE NAVIGATIONAL SYSTEM & METHOD FOR INTERACTIVE REPRESENTATION OF INFORMATION CONTAINED WITHIN A DATABASE

[75] Inventors: Todd Pooser; Jeoffrey Pooser, both of New York, N.Y.

[73] Assignee: Critical Thought, Inc., New York, N.Y.

[21] Appl. No.: 623,390

[22] Filed: Mar. 28, 1996

[51] Int. Cl.$^6$ .................................................. G06F 17/30
[52] U.S. Cl. ........................ 345/356; 707/102; 707/501; 345/355; 345/357
[58] Field of Search .......................... 395/127, 601–622, 395/326–358

[56] References Cited

U.S. PATENT DOCUMENTS

| | | | |
|---|---|---|---|
| 4,752,889 | 6/1988 | Rappaport | 395/601 |
| 4,905,163 | 2/1990 | Garber et al. | 395/127 |
| 5,021,976 | 6/1991 | Wexelblat et al. | 364/513 |
| 5,133,065 | 7/1992 | Cheffetz et al. | 364/513 |
| 5,295,243 | 3/1994 | Robertson et al. | 364/514 |
| 5,297,253 | 3/1994 | Meisel | 395/127 |
| 5,355,497 | 10/1994 | Cohen-Levy | 395/601 |
| 5,375,199 | 12/1994 | Harrow et al. | 364/513 |
| 5,414,809 | 5/1995 | Hogan et al. | 395/127 |
| 5,528,735 | 6/1996 | Strasnick et al. | 395/127 |
| 5,555,354 | 9/1996 | Strasnick et al. | 395/127 |

OTHER PUBLICATIONS

"Visualizing the Structure of the World Wide Web in 3D Hyperbolic Space", Munzner et al., http://www.graphic, stanford,edu/papers/webviz/node10.html, Computer Based Learning Unit, University of Leeds, Aug. 1994.

"Webspace Visualization", ed H. chi, Computer Science Dept, University fo Minnesota, http.//www.geom.umn.edu/software/weboogl/webspace.html, Jun. 1995.

"Case Study: 3D Displays of Internet Traffic", Cox et al., IEEE, 1995, Mar.

"Visualising Cyberspace: Information Visualization in the Harmony Internet Browser", Keith Andrews, 1995 IEEE, Mar. 1995.

"Netcart Webmap Into" screen, http://www.netcarta.com/maps/, Jun. 27, 1996.

"Microsoft Visual Basic Scripting Edition—Site Map," htt:/www.microsoft.com/...pt/us/vbsmain/vbssite.htm, Jun. 27, 1996.

"Conquering the Computer Connection," *San Francisco Examiner* (Feb. 12, 1995).

"User–friendly computers: A screen with many rooms," *The Economist*, (Jun. 29, 1991).

(List continued on next page.)

*Primary Examiner*—Thomas G. Black
*Assistant Examiner*—Hosain T. Alam
*Attorney, Agent, or Firm*—Kenyon & Kenyon

[57] ABSTRACT

A system for interactive, dynamic, three-dimensional presentation of a database's structure allows the user to efficiently navigate through the database to examine the desired information. The present system graphically depicts the organization of the information base as "molecules" consisting of structured parallel "threads" of connected nodes each encompassing a specific aspect of the overall database. Within a given thread, the component nodes, which share a commonality of subject, are arranged in a natural, linear progression which reflects the organizational structure of the information subject represented by the thread, thereby providing the user with a visual guide suggesting the appropriate sequence of nodes to be viewed. By providing a hierarchical representation of the organizational structure of the entire database, the present navigational system provides the user with both the "position" of the information unit being currently examined relative to the remainder of the database, as well as the information regarding the overall size and complexity of the database. The present system also provides the user with the capability to define one or more "customized" navigation "paths" over the database, as well as copy and modify existing units of information.

55 Claims, 20 Drawing Sheets

OTHER PUBLICATIONS

"A picture is worth a thousand, ten thousand—or is it ten million words?, " news release by Pacific Northwest Laboratory, (Mar. 29, 1995).

Advance Program for IEEE "Visualization 95" Conference to be held during Oct. 29—Nov. 3, 1995.

"Wanted: 3–D Room, PARC View," *Computing 2000*, pp. C38–C41, Jul 20, 1992.

"Visualizing cleared–off desktops," *Computerworld*, p. 20 (May 6, 1991).

"Xerox's New Interface: Rooms with a 3–D View," *Blyte* (Oct. 1990).

Andrew Pollack, "The 2–D screen gives 3–D world," *San Jose Mercury News*, Section F (Nov. 4, 1990).

Mark Clarkson, "An Easier Interface," *Byte*, pp. 277–282 (Feb. 1991).

Gene Bylinsky, "The Payoff from 3–D Computing," *Fortune*, p. 32 (Information Technology Special Report, autumn 1993) Sep., 1993.

George Robertson, S. Card and J. Mackinlay, "Information Visualization Using 3D Interactive Animation," *Communication of the ACm*, vol. 36, No. 4, pp. 57–71 (Apr. 1993).

George Robertson, S. Card and J. Mackinlay, "Cone Trees: Animated 3D Visualizations of Hierarchical Information," System Sciences laboratory, Xerox Palo Alto Research Center, Apr., 1993.

Kim Fairchild, S. Poltrock and G. Furnas, "SEMNET: Three–Dimensional Graphic Representations of Large Knowledge Bases," *Cognitive Science and Its Application for Human–Computer Interaction*, pp. 201–232 (Lawrence Erlbaum Associates, Inc., Hillside, New Jersey, Dec. 1988.

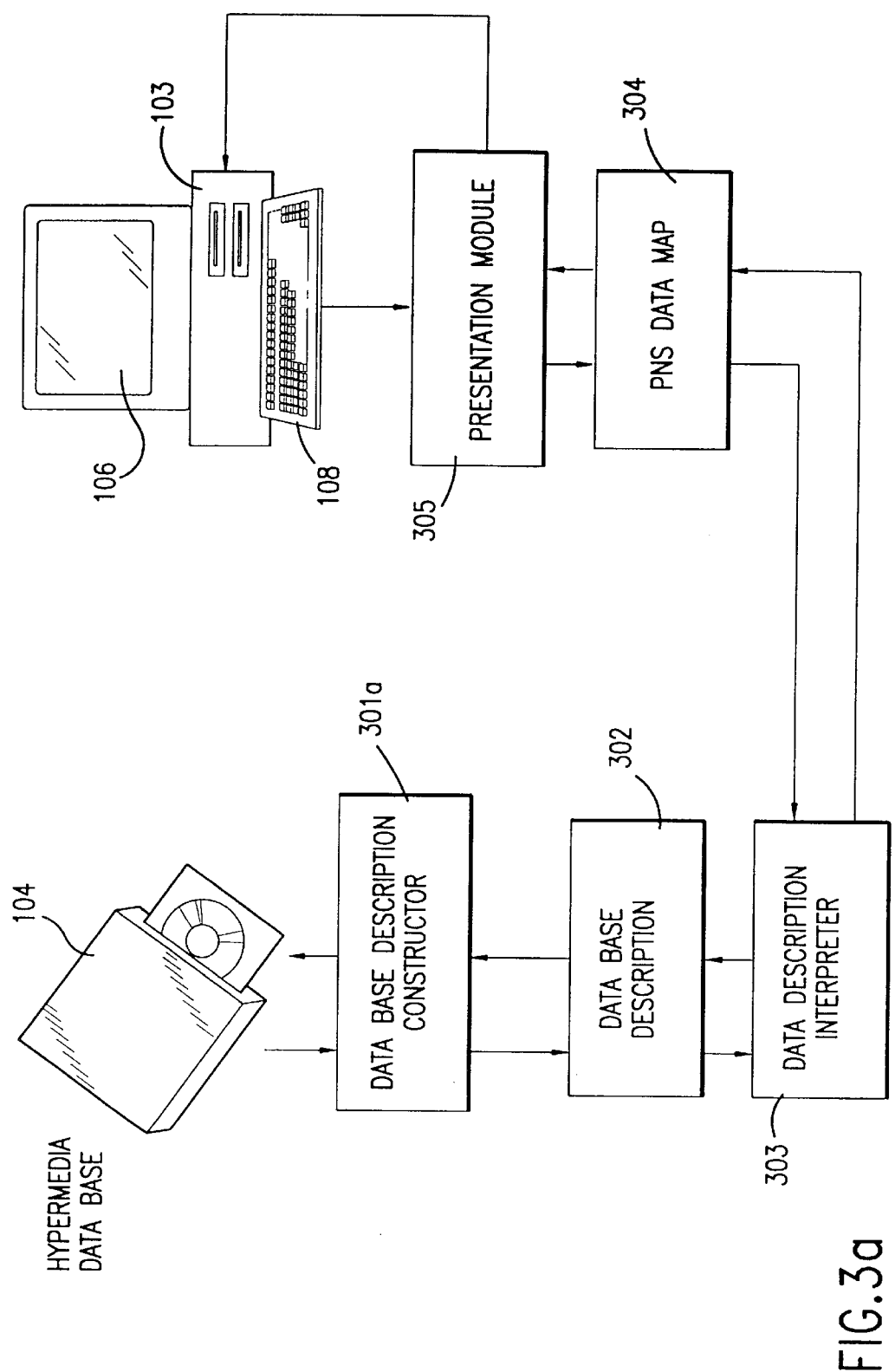

| L3 NODE ID | L3 THREAD ID | PREVIOUS L3 NODE ID | NEXT L3 NODE ID | NUMBER OF ELEMENTS | FIRST ELEMENT ID | LAST ELEMENT ID | DESCRIPTION |
|---|---|---|---|---|---|---|---|
| 701 | 708 | 702 | 703 | 704 | 705 | 706 | 707 |

FIG.7

| 801 | 806 | 802 | 803 | 804 | 805 |
|---|---|---|---|---|---|
| L3 THREAD ID | L3 MOLECULE ID | NUMBER OF L3 NODES | FIRST L3 NODE ID | LAST L3 NODE ID | DESCRIPTION |

FIG. 8

| 901 | 904 | 902 | 903 |
|---|---|---|---|
| L3 MOLECULE ID | L2 NODE ID | NUMBER OF L3 THREADS | DESCRIPTION |

FIG. 9

| L2 NODE ID | L2 THREAD ID | PREVIOUS L2 NODE ID | NEXT L2 NODE ID | NUMBER OF L3 MOLECULES | DESCRIPTION |
|---|---|---|---|---|---|
| 1001 | 1002 | 1003 | 1004 | 1005 | 1006 |

FIG.10

| L2 THREAD ID | L2 MOLECULE ID | NUMBER OF L2 NODES | FIRST L2 NODE ID | LAST L2 NODE ID | DESCRIPTION |
|---|---|---|---|---|---|
| 1101 | 1102 | 1103 | 1104 | 1105 | 1106 |

| L2 MOLECULE ID | L1 NODE ID | NUMBER OF L2 THREADS | DESCRIPTION |
|---|---|---|---|
| 1201 | 1202 | 1203 | 1204 |

FIG.13

| L1 NODE ID | L1 THREAD ID | PREVIOUS L1 NODE ID | NEXT L1 NODE ID | NUMBER OF L2 MOLECULES | DESCRIPTION |
|---|---|---|---|---|---|
| 1301 | 1302 | 1303 | 1304 | 1305 | 1306 |

| L1 THREAD ID | L1 MOLECULE ID | NUMBER OF L1 NODES | FIRST L1 NODE ID | LAST L1 NODE ID | DESCRIPTION |
|---|---|---|---|---|---|
| 1401 | 1402 | 1403 | 1404 | 1405 | 1406 |

FIG.14

| L1 MOLECULE ID | PANORAMA ID | NUMBER OF L1 THREADS | DESCRIPTION |
|---|---|---|---|
| 1501 | 1502 | 1503 | 1504 |

FIG.15

| PANORAMA ID | NUMBER OF L1 MOLECULES | DESCRIPTION |
|---|---|---|
| 1601 | 1602 | 1605 |

FIG.16

USER INTERFACE NAVIGATIONAL SYSTEM & METHOD FOR INTERACTIVE REPRESENTATION OF INFORMATION CONTAINED WITHIN A DATABASE

FIELD OF THE INVENTION

This invention relates generally to a system and a method for interactive graphic presentation of databases, and relates more particularly to a system and a method for interactive, graphic, three-dimensional presentation of databases which allow the user to view the logical relationship between a chosen data unit and the overall structure of the given database.

COPYRIGHT NOTICE

Portions of the disclosure of this patent document contain material which is subject to copyright. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

As the amount of information available to a computer user increases, the problem of coherently presenting the range of available information to the computer user in a manner which allows the user to comprehend the overall scope of the available information becomes more significant. Furthermore, coherent presentation of the relationship between a chosen data unit of the available information to the rest of the available information also becomes more significant with the increase of information available to the user.

Most of the existing methods utilize lists, not graphic models, to indicate the structure of the available information. The main problem associated with the use of lists is the difficulty of indicating the size and complexity of the data base containing the available information. In addition, because the lists are presented in a two-dimensional format, the manner of indicating the relationship between various data units of the available information is restricted to the two-dimensional space. Furthermore, because presentation of the lists normally requires a significant part of the screen, the user is forced to reduce the amount of screen occupied by the list when textual and visual information contained in the data base is sought to be viewed. When this occurs, the user's current "position" relative to other data units of the available information is lost. Subsequently, when the user desires to reposition to some other data unit (topic), the screen space occupied by the lists must be enlarged. Repeated sequence of adjusting the screen space occupied by the lists tends to distract the user, thereby reducing productivity.

One attempt to alleviate the above-described problem is illustrated by U.S. Pat. No. 5,021,976 ("the '976 patent"), which discloses a system for enabling a user to interact with visual representations of information structures stored in a computer. In the system of the '976 patent, a set of mathematical relationships is provided in the computer to define a plurality of parameters which may be of interest to the user, which mathematical relationships are also capable of indicating a degree of correlation between the defined parameters and segments of information contained in a defined information system. In addition, an "automatic icon" with multiple visual features is provided to enable the user to visualize the degree of correlation between the parameters of interest to the user and the particular data unit stored in the computer which is being examined by computer. As the degree of correlation for a given parameter changes, the visual feature representing that parameter will change its appearance.

Another attempt to coherently present a large body of information to a computer user is illustrated by U.S. Pat. No. 5,297,253 ("the '253 patent"), which discloses a computer-user-interface navigational system for examining data units stored in the memory of a computer system. In the navigational system of the '253 patent, the user interface shows a continuous and automatically updated visual representations of the hierarchical structure of the information accessed. By using an input/output device to manipulate icons which appear in a navigational panel, the user can navigate through the information hierarchy. As the user traverses the information hierarchy, a node icon representing each level in the hierarchy accessed by the user is displayed. The user is also able to directly select any level in the information hierarchy between the entry point and the level at which the user is currently located.

Yet another approach to coherently presenting a large body of information to a computer user is "SEMNET," which is described in: Raymonde Guindon, ed., *Cognitive Science and Its Applications for Human-Computer Interaction,* (Hillsdale, N.J.: Lawrence Erlbaum Associates, Inc., 1988), 201–232. SEMNET is a three-dimensional graphical interface system which allows the users to examine specific data units of an information base while maintaining the global perspective of the entire information base. The SEMNET developers propose organizing component data units of an information base into various levels of hierarchy. At the lowest level of hierarchy, the most basic data units are organized into various sets, or cluster-objects of related information. At the next level of hierarchy, related cluster-objects from the lower hierarchical level are organized into a higher-level cluster-object. Continuing in this manner, SEMNET achieves a hierarchical organization of the information base. In the graphic display, related data units within a cluster-object are connected by lines, or arcs. In addition, using a "fisheye view" graphic presentation, SEMNET displays the most basic data units near the chosen data unit but only cluster-objects of increasing hierarchy as the distance increases from the chosen data unit. In this manner, the user is able to visualize the organization of the information base relative to the chosen data unit.

Although the above-described approaches address certain aspects of coherent data organization and presentation, none of the approaches presents a visual metaphor of the information organization which implies a directed, linear progression among related data units. Furthermore, none of the above-described approaches presents an effective visual representation of the overall size, complexity and organization of the entire information system (e.g., a database) relative to a chosen data unit of the information system. In addition, the user's capability to create a new data unit in the information system, or "customization" capability, is severely limited in the above-described approaches.

There is therefor a need to provide an improved system and method for interactive, three-dimensional graphic presentation of information organization within an information base, which system and method allow the user to efficiently navigate through the information base by following a graphically-implied path of search progression, as well as allowing the user to customize chosen information units of the information base.

OBJECTS AND SUMMARY OF THE INVENTION

The present invention provides a system and a method for presenting three-dimensional graphic display of information organization within an information base, which system and method allow the user of the information base to efficiently navigate through, and interact with, the information base by following a graphically-implied path of search progression. By providing a graphic display of the logical organization, or structure, of the component information units in the information base, the system according to the present invention allows the user to effectively visualize the overall size, complexity and organization of the entire information base (a database), as well as allowing the user to visualize the relationships among various component information units contained in the information base.

The system according to the present invention graphically depicts the organization of the information base as a three-dimensional, animated, color-coded "map." The map presents to the user structured parallel streams, or "threads," of connected nodes describing a specific aspect, or information unit, of the overall information base, or a "global object." Threads may be differentiated by the use of color coding. The component nodes of a given thread may share a commonality of subject or idea. Within a given thread, the nodes are arranged in a natural, linear progression which reflects the structure of the information unit represented by the thread. A set of multiple threads constitute a "molecule." A given information base may contain one or more molecules. Related elements of different threads may be connected by a link.

The molecule may be viewed as a set of "paths" which provide the user with a visual guide (vector), suggesting the appropriate sequence of nodes (information units) to be viewed. At the same time, the navigational system according to the present invention allows the user to skip any part of the path, return to a previous node (or element), or jump to a related information unit that is not on the main path. Because each "path" (the thread) presents a highly intuitive progression, the user is naturally guided on the path in a left-to-right direction. However, the natural left-to-right progression may be customized to a right-to-left progression.

The graphic display generated by the navigational system according to the present invention allows depiction of several different hierarchical levels of information organization, i.e., a node of a molecule in the highest hierarchical level may contain several lower level molecules, etc. By assigning a graphical location to each information unit, the information-base user is provided with the orientation of the selected information unit relative to the rest of the information base, as well as being provided with an immediate understanding of the overall size and complexity of the information base.

Because the graphic display generated by the system according to the present invention occupies relatively little space on the computer screen and can remain on the screen at all times, the user is continuously provided with information regarding the "position" of the information unit being currently examined relative to the rest of the information base. Furthermore, because the graphic display of the overall structure of the information base is always visible to the user, the user can reposition to any point within the information base by, for example, a single point-and-click operation of a mouse.

Furthermore, because a single graphic display describes both the overall structure of the information base and the position of the information unit being currently examined relative to the remainder of the information base, the user need not switch between different screen displays to obtain these two pieces of information.

Another advantage of the navigational system according to the present invention is that it provides an animated, "three-dimensional" view of the graphic display representing the entire information base. Normally, a two-dimensional graphic display is limited in the number of connection lines between various nodes which may be shown without confusing the viewer. By providing a capability to rotate the orientation of the molecules relative to the viewer of the computer screen, the system according to the present invention provides a depth perception to the graphic display. By providing a three-dimensional view of the molecules, the present system provides a significantly enhanced capability to clearly present the organizational structure of the information base.

Yet another advantage of the navigational system according to the present invention is the feature which allows the users to "customize" the views of the structure of the information base, as well as copy and modify existing units of information. The navigational system according to the present invention provides the capability to define one or more custom "paths" over a large information base of textual, audio and visual information. A path can be created by the information-base designer or the user. The user can create a customized path by selecting appropriate elements of the data base or by altering a path originally provided with the information base. The user may also choose to have the navigational system automatically create a customized path. The "automatic customization" may be achieved by allowing the navigational system to record the selections made (information units chosen) by the user when accessing the information base. The customized path then may be saved for future use. Once a customized path has been created for a certain database, it can be used to access another similarly structured data base, such as a new issue of a CD-ROM magazine or another patient record.

Several areas of application exist for the navigational system according to the present invention. One of these areas is the health care field. For example, patient records including clinical data, test results, ultrasound, CAT scan and x-ray images, etc. may be represented as threads. A physician may follow a given thread, then follow a link and look at related data from another thread. Furthermore, because the navigational system according to the present invention has the ability to provide different "views" of the same body of information, the user has the option to choose the view most appropriate for his or her application. For example, working with a patient record, a psychologist may use a view of the patient records different from the view used by an internist.

Another area of application is the legal field. For example, a specific case, similar cases and relevant legal information may presented by different threads. Pending legislative bills, relevant information, related bills and existing laws may be made easily searchable by the thread representation.

Yet another area of application is the computer-based information services. For example, the navigational system according to the present invention may be used in connection with on-line information service. For on-line navigation of web pages, for example, the navigational system according to the present invention may present the organization of available information as a hierarchical organization by means of the thread and molecule structures of the present invention.

In the area of computer-based HELP systems, the navigational system according to the present invention greatly improves upon the existing computer HELP systems which, by presenting the user with mere lists, results in the users' quickly losing their position within the network of "hypertext" links. Hypertext is an interface function involving highlighted words or phrases in a text field. By pointing and clicking a mouse icon on the highlighted words/phrases, additional information qualifying or expounding upon the highlighted words/phrases is displayed on the screen. For implementing computer-based training (CBT), a series of lessons on a specific subject area may be facilitated by utilizing the molecule presentation of the navigational system according to the present invention.

Other applications include entertainment and educational software. For interactive CD ROM publications and periodicals, individuals may create his or her own "views" of the information base depending on the area of personal interest and age: travel, music, politics, etc. The personalized views can be saved and applied to the next issue of the periodical, providing convenience and time savings. In addition, for educational applications, the navigational system according to the present invention improves upon the currently existing interfaces, for the use of which the users need training and must spend significant amounts of time becoming proficient in the intricacies of a list based interface. The visual and intuitive nature of the navigational system according to the present invention facilitates young children and beginning computer users to start using, and quickly learn, the interface without extensive training.

Another potential application of the navigational system according to the present invention is a CD-ROM, multimedia encyclopedia. The encyclopedia may be "written" to include a number of "paths," such as lessons in physics, technology, history of art, etc. Using these various paths, the same component elements of the encyclopedia can be incorporated in many different ways without duplication. The user can also create a custom path reflecting specific area of interest.

Yet another area of application for the present invention is direct marketing via CD-ROM, mail-order catalogs. The threads of the graphic display generated by the present invention may be used to represent different categories of merchandise, such as clothing, footwear, furniture, tools, etc. For direct marketing of business equipment and office supplies, for example, a potential purchaser may follow a thread to select a printer, the description of which may be cross-linked to the appropriate paper supply, replacement parts, cable, etc. In this manner, the product-selection process can be greatly streamlined and simplified.

It is an object of the present invention to provide a system for presenting three-dimensional graphic display of hierarchical organization of information within an information base.

It is another object of the present invention to provide a method for presenting three-dimensional graphic display of hierarchical organization of information within an information base.

It is yet another object of the present invention to provide a system for presenting three-dimensional graphic display of information organization within an information base, which system facilitates the user of the information base to efficiently navigate through the information base by following a graphically-implied path of search progression.

It is yet another object of the present invention to provide a method for presenting three-dimensional graphic display of information organization within an information base, which method facilitates the user of the information base to efficiently navigate through the information base by following a graphically-implied path of search progression.

It is yet another object of the present invention to provide a system for presenting three-dimensional graphic display of information organization within an information base, which system facilitates the user of the information base to modify the organizational structure and/or the content of the information base.

It is yet another object of the present invention to provide a method for presenting three-dimensional graphic display of information organization within an information base, which method facilitates the user of the information base to modify the organizational structure and/or the content of the information base.

It is yet another object of the present invention to provide a system for providing a graphic display of the structural organization of the component information units within an information base, which system facilitates the user to simultaneously visualize the overall size, complexity and organization of the entire information base.

It is yet another object of the present invention to provide a method for providing a graphic display of the structural organization of the component information units within an information base, which method facilitates the user to simultaneously visualize the overall size, complexity and organization of the entire information base.

It is yet another object of the present invention to provide a system for providing a graphic display of the structural organization of the component information units within an information base, which system facilitates the user to visualize the relationship between the information unit being currently viewed and the remaining information units of the information base.

It is yet another object of the present invention to provide a method for providing a graphic display of the structural organization of the component information units within an information base, which method facilitates the user to visualize the relationship between the information unit being currently viewed and the remaining information units of the information base.

BRIEF DESCRIPTION OF THE DRAWINGS

FIG. 3a is a block diagram of one representative embodiment of the software architecture of the navigational system according to the present invention.

FIG. 7 is a block diagram of the data structure for a "node" unit of information at hierarchical level L3.

FIG. 8 is a block diagram of the data structure for a "thread" unit of information at hierarchical level L3.

FIG. 9 is a block diagram of the data structure for a "molecule" unit of information at hierarchical level L3.

FIG. 10 is a block diagram of the data structure for a "node" unit of information at hierarchical level L2.

FIG. 11 is a block diagram of the data structure for a "thread" unit of information at hierarchical level L2.

FIG. 12 is a block diagram of the data structure for a "molecule" unit of information at hierarchical level L2.

FIG. 13 is a block diagram of the data structure for a "node" unit of information at hierarchical level L1.

FIG. 14 is a block diagram of the data structure for a "thread" unit of information at hierarchical level L1.

FIG. 15 is a block diagram of the data structure for a "molecule" unit of information at hierarchical level L1.

FIG. 16 is a block diagram of the data structure for a "panorama" unit of information contained in the database.

DETAILED DESCRIPTION OF THE INVENTION

Figure 1:
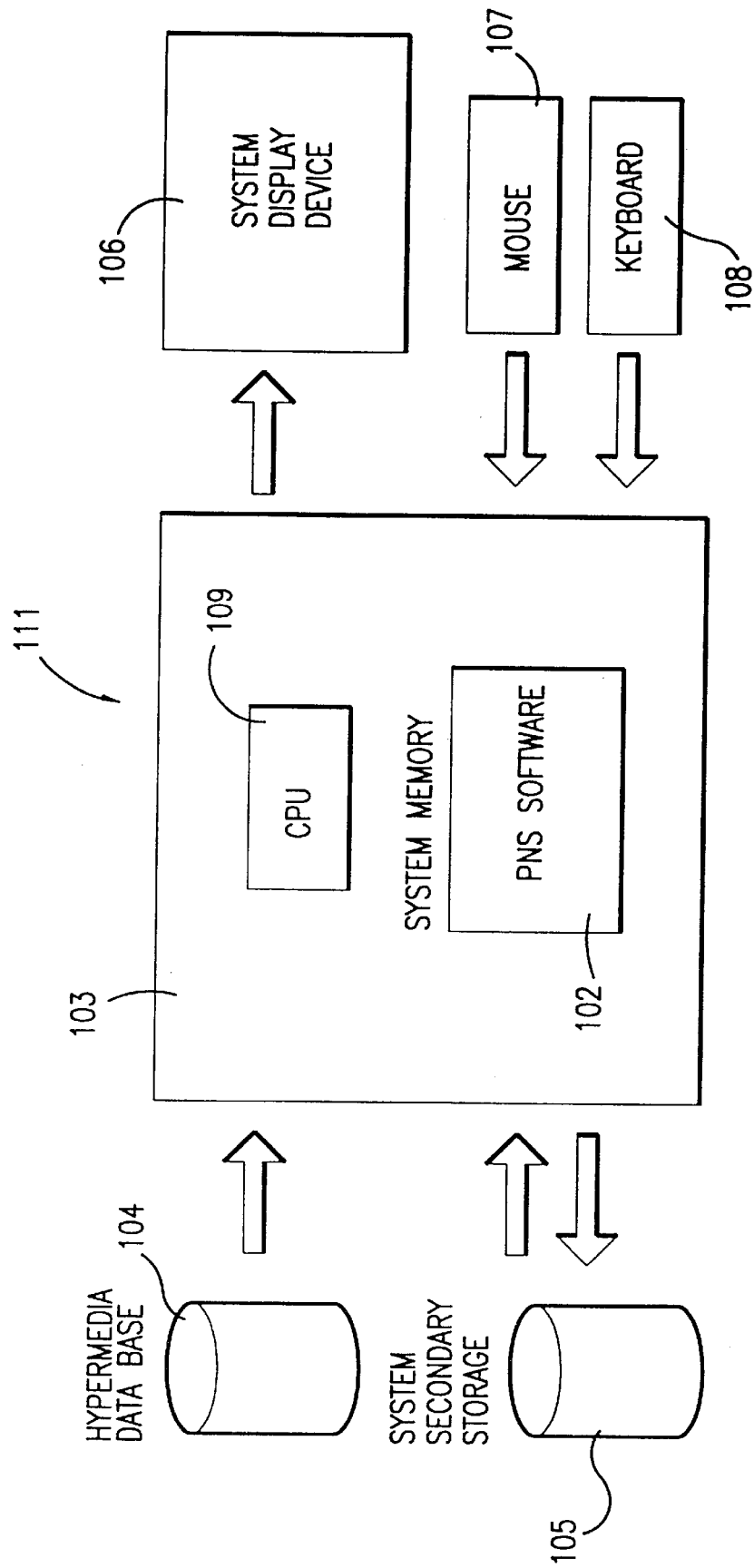
FIG. 1 is a block diagram of one representative embodiment of the hardware configuration for implementing the navigational system according to the present invention.
Figure 2:
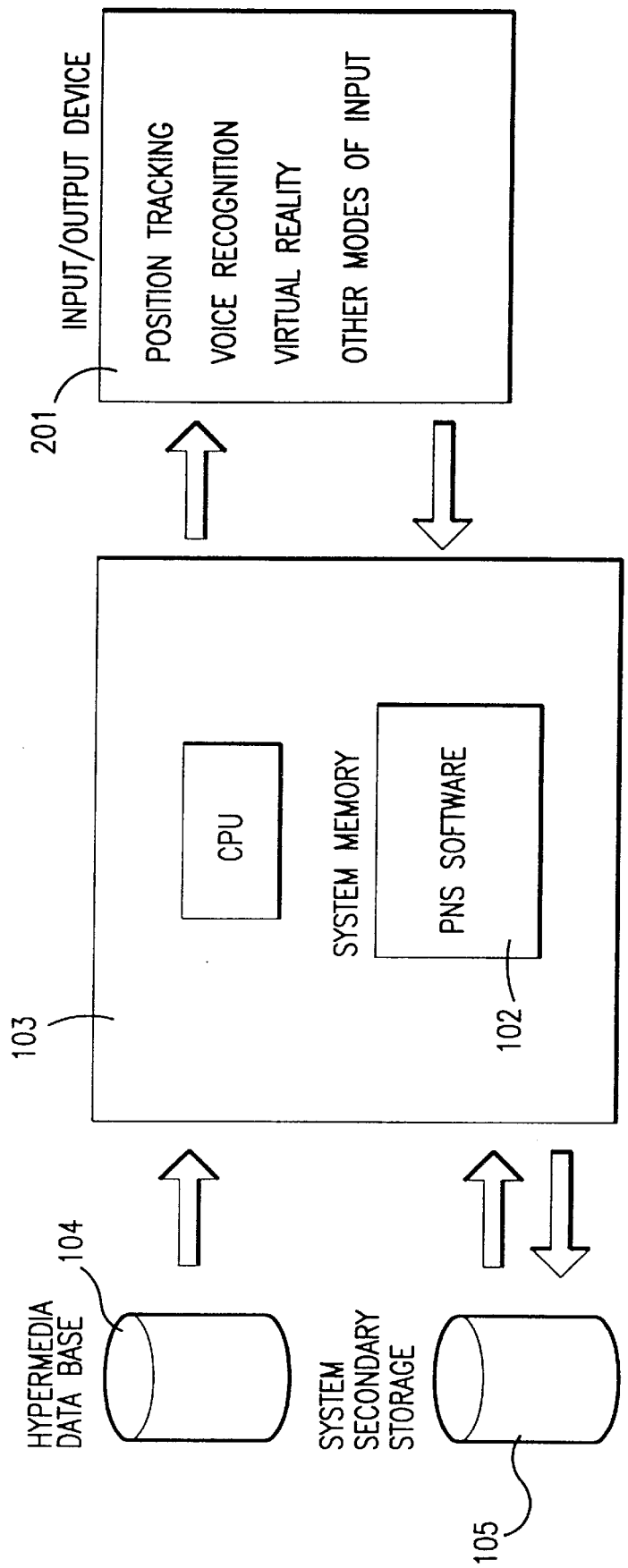
FIG. 2 is a block diagram of another representative embodiment of the hardware configuration for implementing the navigational system according to the present invention.

As shown in FIG. 1, a navigational system 111 according to the present invention includes a navigational program 102, hereinafter also referred to as "PNS software," which is implemented by a computer 103, having a CPU 109, in conjunction with a "hypermedia" database 104, an optional, secondary storage medium 105, a system display device 106, and input devices such as a mouse 107 and/or a keyboard 108. Alternatively, as shown in FIG. 2, a more sophisticated input/output device capable of position tracking, voice recognition, virtual reality display, etc., may be utilized. The hypermedia database 104, which typically contains text, audio and visual information, may reside in any medium with sufficient data storage and transfer rate capabilities, such as a CD ROM or a magnetic storage medium. In addition, the hypermedia database 104 may be a network of information such as, for example, the Internet, and more specifically, the World Wide Web. When used herein, the terms "database," "information base" and "hypermedia database" include any depository of data in electronic form, regardless of the internal structure, representation or form of such data.

Figure 4:
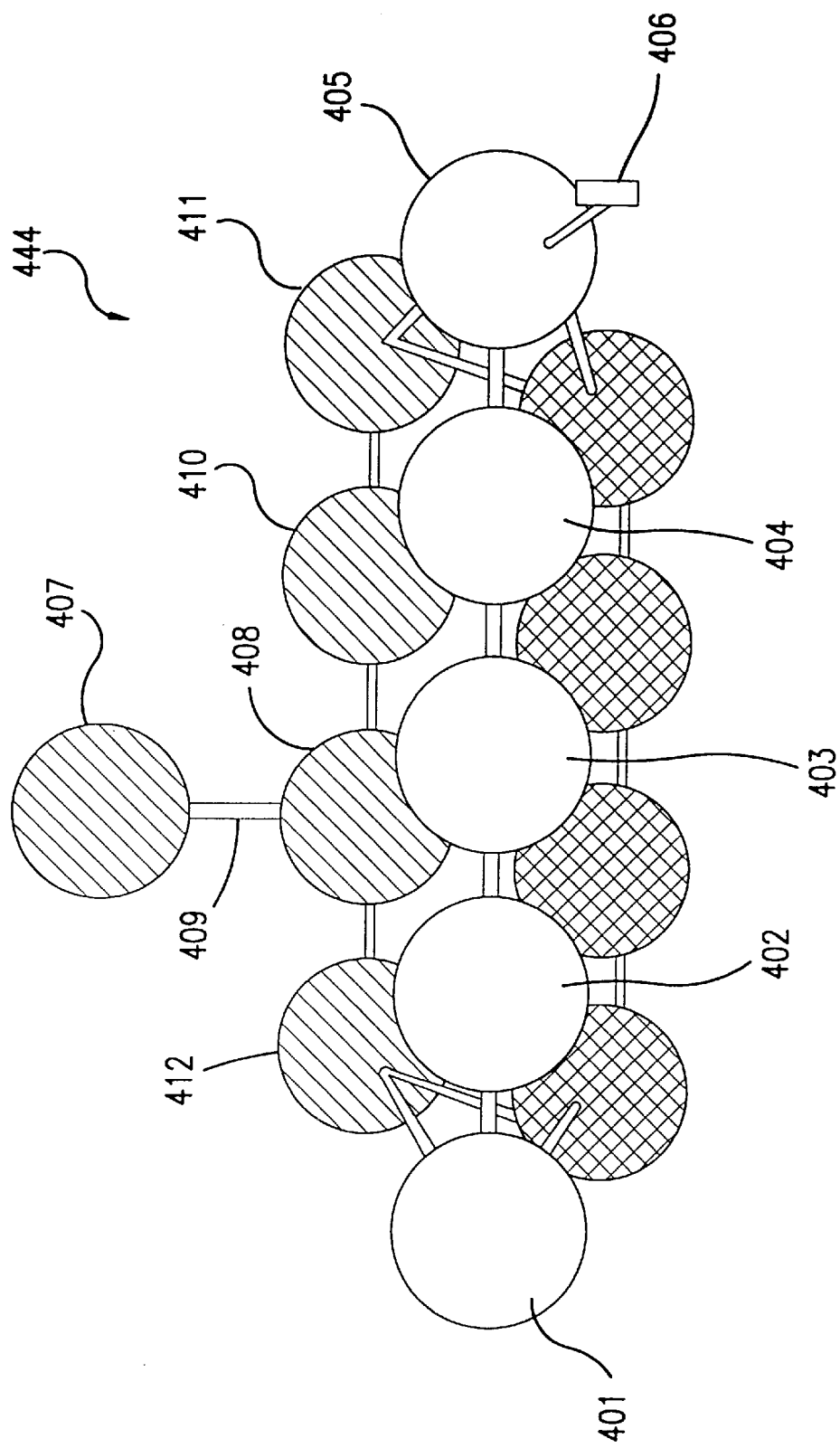
FIG. 4 is a diagram of an exemplary information "molecule."

Once the PNS software 102 is initialized and the CPU 109 receives instructions from the mouse 107 or the keyboard 108 to access the hypermedia database 104, the PNS software 102 generates a graphic display of the organizational structure of the hypermedia database 104 on the system display device 106. As shown in FIG. 4, graphic display of the organizational structure is in the shape of a chemical "molecule" 444. A single database may be represented by one or more "molecules" of one or more hierarchical levels, i.e., a high-level molecule may contain many lower-level molecules. By utilizing the "molecules" as a map of the hypermedia database 104, a user can efficiently navigate through the database 104 to access the desired information units.

Before proceeding further, it is helpful to explain several terms which are useful to the explanation of the graphic representation of the organizational structure of the hypermedia database 104. An "element" is the smallest unit of data, or information, within a given hierarchical level of organization that may be represented by the navigational system according to the present invention utilizing the PNS software 102. For visual depiction, the element may be represented by any appropriate symbol, e.g., a triangle or a star. If desired, the PNS software 102 may include an end-user function which allows the user to create a customized element symbol. In its internal format, the "element" includes a pointer to a data object in the hypermedia database. The data object may be, but is not limited to, one of the following types: a text file; a graphics file representing still image; a video file representing motion video; a sound file; a help text page; a patient record; an encyclopedia entry; etc. Although each "element" may be represented by a symbol, in the representative embodiment of the present system each element would be visually manifested as the actual information content therein, i.e., a text field, a still graphics, an audio file, or a motion video.

A "node" is a collection, or a set, of elements. The elements constituting a single node can be of different types. In its visual representation, the node may appear as any appropriate symbol, e.g., a sphere, as shown and denoted by numerals e.g. 401 and 408 in FIG. 4. Nodes may be differentiated and identified by text descriptions generated on the computer screen when the user selects a particular node during the navigation of the hypermedia database 104. Once again, the PNS software 102 may include an end-user function which allows the user to create a customized node symbol.

A "thread" is a collection of ordered nodes. The component nodes of the thread share a commonality of subject or idea. In its visual representation, the nodes are presented in a natural left-to-right horizontal progression, thereby implying, and reflecting, the organizational structure of the information unit represented by the thread. The sequence of nodes 401–405 shown in FIG. 4 constitute a single thread. All nodes of a thread need not fall within a single linear path: nodes 407, 408, 410, 411 and 412 shown in FIG. 4 form a single thread. Different threads may be differentiated by the use of color coding. The PNS software 102 may include an end-user function which allows the user to customize the node sequence such that the "natural" progression of information organization proceeds from right to left.

The "molecule," as shown and denoted by numeral 444 in FIG. 4, is a collection, or a set, of parallel or associated threads. The molecule is a visual object that is created dynamically, during the run time. Each molecule may represent a single concept at a given level of abstraction. As will be explained in greater detail below, the PNS software 102 may generate a number of molecules for a given hierarchical level, depending on the "rules of data organization," e.g., the number of elements which may be part of a node in a given hierarchical level, the number of nodes which may be part of a thread in a given hierarchical level, and the number of threads which may be part of a molecule in a given hierarchical level.

The molecule may be viewed as a collection of "paths" (threads) which provide the user with a visual guide, suggesting the appropriate sequence of nodes to be viewed for a given subject area. Because the molecule is presented in such a manner that the majority of the nodes of a given thread are arranged in a linear, horizontal sequence, which is a highly intuitive progression, the user is naturally guided on the thread in a left-to-right direction. The nodes of a given thread are arranged on the basis of each node's information content such that, when the nodes are examined in the left-to-right sequence, the general subject matter represented by the thread is logically presented to the user. While the graphic display generated by the navigational system according to the present invention suggests a search direction to the user, at the same time, the navigational system allows the user to skip any part of the thread, return to a previous node (or element), or jump to a related node on another thread.

A "link" is a pointer from an element encompassed within a node of a first thread to an element encompassed within a node of a second thread, which second element contains information related to the information of the element from which the link originates. The link may connect two threads of the same molecule or two different molecules. Alternatively, the link may connect two nodes of the same thread which are not in the linear path of the thread, as shown by link 409 connecting nodes 407 and 408 in FIG. 4. In its visual representation, the link may be shown as a line connecting the node symbols on different threads. Alternatively, the link may be indicated by a pair of "trap doors," one on each of the connected nodes. An example of the trap door is shown and denoted by the numeral 406 in FIG. 4. Yet another alternative representation of the link may be achieved by the use of an on-screen icon, which will be explained below in detail in connection with FIG. 5a. The PNS software 102 may include an end-user function which allows the user to customize the link's visual attributes, e.g., color.

The above explanations of "elements," "nodes," "threads," and "molecules" apply to each level of multiple-level hierarchical structure. When multiple hierarchical levels exist, as illustrated in FIG. 5d showing a three-level hierarchical structure, an "element" of a non-lowest level of hierarchy would correspond to a "molecule" of the immediately lower level in the hierarchy. As shown in FIG. 5d, the lowest level of hierarchy, "L3," includes molecule "C" of six nodes; the current node is indicated by "C1." Molecule C is contained in node "B1" of the next higher level molecule, molecule "B" of level "L2." Molecule C would be an "element" of node B1. Molecule B is contained in node "A1" of the highest level molecule, molecule "A" of level "L1." Molecule B would be an "element" of node A1.

Finally, a "panorama" is defined as the most comprehensive information "object" generated by the PNS software, akin to a global map of the database 104. The panorama contains information about the molecules, threads, nodes, elements and links which, in its entirety, conveys a particular view of the entire hypermedia database 104. Although "panorama" generally refers to a visual representation encompassing all the levels of a multiple-level hierarchical structure, the term may be qualified to refer to a specific level of the multiple-level hierarchical structure. For example, a "level 3 panorama" would refer to the graphic depiction of a third-level organizational unit of a multiple-level hierarchical structure.

The user will navigate through the panorama by pointing at, and selecting, the desired information unit via a position-indicating icon, which may be controlled by a mouse or voice-controlled or optically controlled input device. As will be explained in further detail below, the PNS software may include an end-user function which allows the user to create a new, customized panorama by: selecting parts of an existing panorama; creating a new panorama from independent text, audio and video files; and/or combining parts of an existing panorama with text, audio and video files.

Figure 5A:
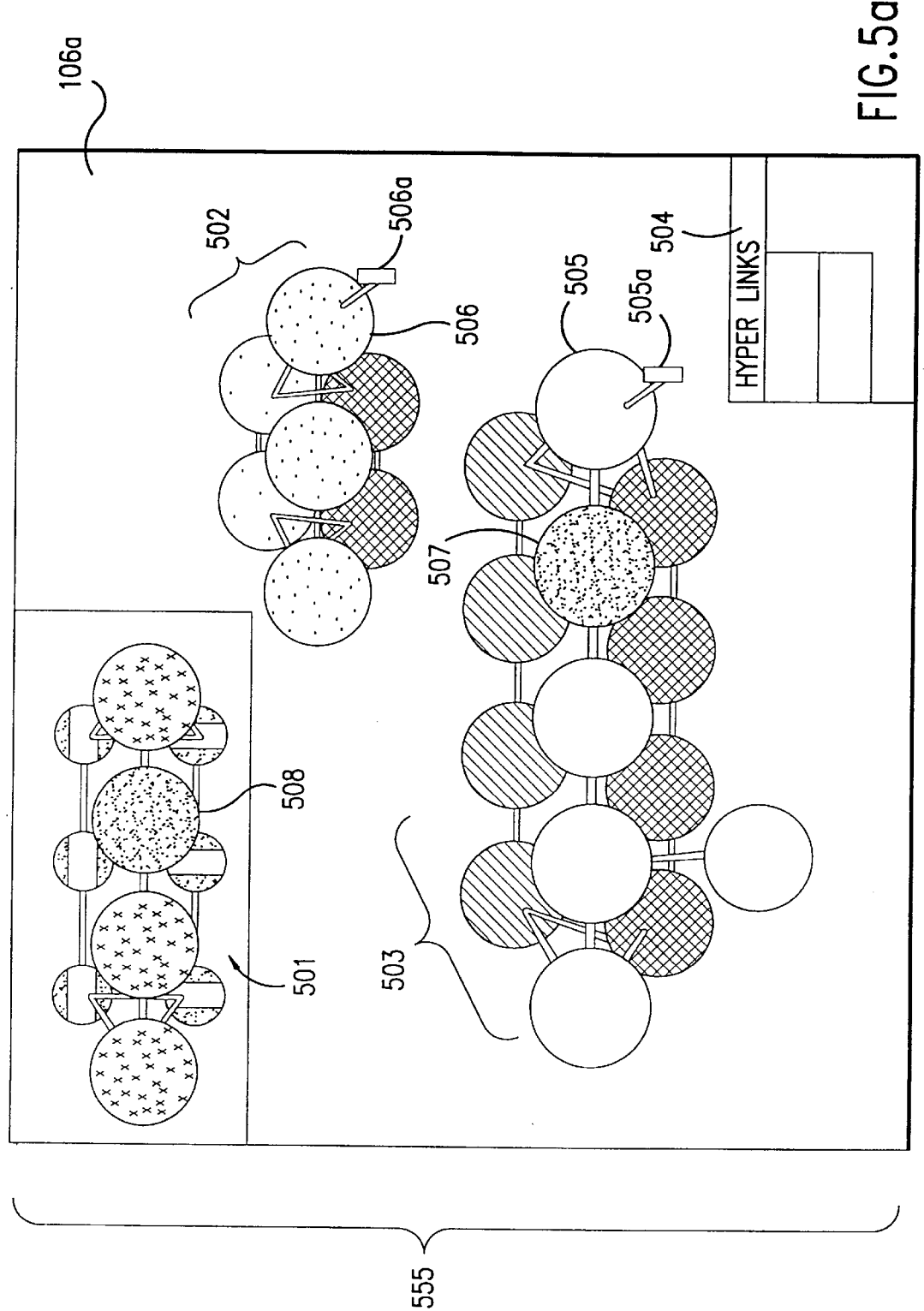
FIG. 5a is a diagram of an exemplary computer-screen display showing a "panorama," including multiple information "molecules" organized in multiple hierarchical levels.

As shown in FIG. 5a, an exemplary panorama 555 is depicted as being shown on the display device 106, e.g., a CRT screen. At one corner of the screen 106 is shown a "thumbnail" display of the highest hierarchical level molecule 501, representing the most general description of the overall structure of the database being examined. In the main display area 106a of the screen, molecules 502 and 503 of the second hierarchical level are depicted. The current "position" of the user within the database, or the information unit currently being examined by the user, is indicated by any one of appropriate notation mechanisms, e.g., a unique color.

In FIG. 5a, the current position is indicated by black coloring, i.e., the node 507 of the molecule 503, which is in turn encompassed within the node 508 of the highest hierarchical level molecule 501. Since the selected node 507 is contained in the lowest level molecule, the individual elements, which may be audio, text or video files, contained in the selected node 507 will be presented to the user. The user is able to navigate within the selected node 507 by selecting any one of the component elements, or by using "Stop," "Previous," "Play" and "Forward" selection icons which may be displayed on the screen 106. If no navigational option is exercised by the user, the elements contained in the selected node 507 will be presented to the user in the sequence as "mapped" by the data map 304, followed by the presentation of next node in the thread, node 505.

The panorama depicted in FIG. 5a represents a two-level hierarchy. It should be noted that each level of hierarchy may contain any number of molecules. Furthermore, there may be any number of "thumbnail" boxes, each thumbnail representing a different hierarchical level. For example, a panorama may depict two thumbnail boxes each having two molecules, in addition to several molecules in the main display area, thereby representing a three-level hierarchy.

Also shown in FIG. 5a are a pair of "trap doors" 505a and 506a. As defined above, trap doors 505a and 506a represent a type of "link," a pointer between the node 506 of molecule 502 and the node 505 of molecule 503, indicating the existence of related information in the linked node. In a representative embodiment of the graphic display, the trap door 505a will exhibit the color of the "linked" node 506, and the trap door 506a will exhibit the color of the linked node 505. A trap door may lead to more than one connected node. When multiple sets of trap doors, each set connecting related nodes, are present within a single hierarchical level, different sets of trap doors would be distinguished by color and/or shape of the "trap door" icons.

Continuing with the description of the panorama depicted in FIG. 5a, shown in the lower right corner of FIG. 5a is a "hyper link display area" (or a "hyper audio/visual display area") 504. The hyper link display area 504 is dedicated to presenting on-screen icons indicating links between two nodes located on different molecules. For example, if a link exists between the current node 507 and another node, the hyper link display area 504 would show the appropriate icon or color of the linked node.

As can be seen from FIG. 5a, the PNS software 102 generates an animated, three-dimensional graphic representation of the database 104, and more specifically, a representation of the information organization within the hypermedia database 104. By providing a graphic metaphor for the organizational structure of the hypermedia database 104, the navigational system according to the present invention allows the user to effectively visualize the overall size, complexity and organization of the entire hypermedia database 104, as well as allowing the user to visualize the relationships among various component information units, e.g., nodes, contained in the information base.

Because the panorama representing the entire hypermedia database 104 may be represented on a single screen display, and may remain on the screen at all times, the user is continuously provided with information regarding the "position" of the information unit being currently examined relative to the rest of the database. Furthermore, because a single panorama describes both the overall structure of the hypermedia database 104 and the position of the information unit being currently examined relative to the remainder of the database, the user need not switch between different screen displays to obtain these two pieces of information.

By providing an animated, three-dimensional view of the molecules, the navigational system according to the present invention provides a significantly enhanced capability, in comparison to a two-dimensional graphic display, to clearly present the organizational structure of the information base. A two-dimensional graphic display is limited in the number of connection lines between various nodes which may be shown without confusing the viewer. In contrast, the navigational system according to the present invention, by providing the capability to rotate the on-screen orientation of the molecules relative to the viewer of the computer screen, allows a significantly increased number of connecting lines to be included in the panorama without confusing the viewer.

Figure 5B:
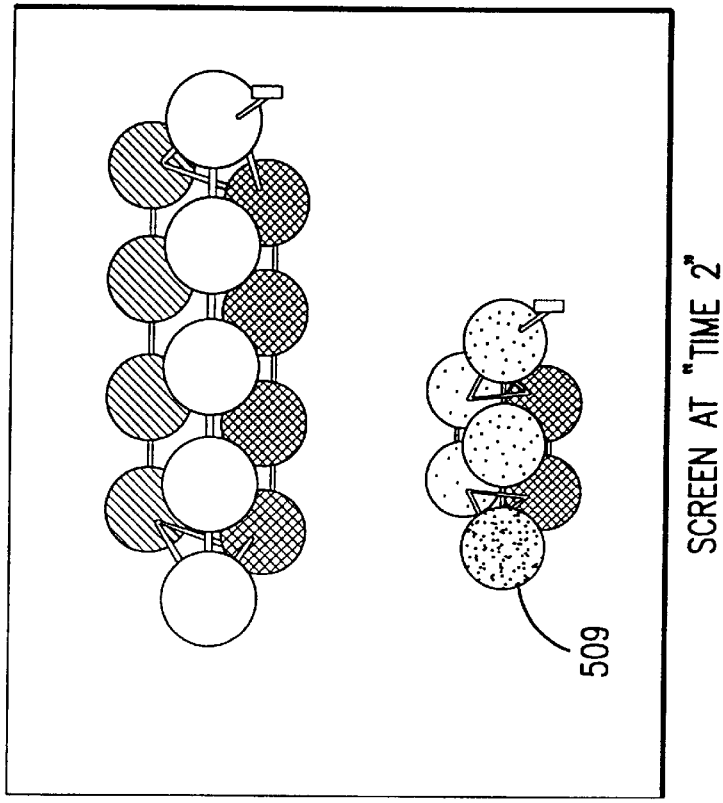
FIG. 5b is a diagram of a pair of exemplary computer-screen displays illustrating the animated, three-dimensional nature of the panorama generated by the navigational system according to the present invention.
Figure 5B:
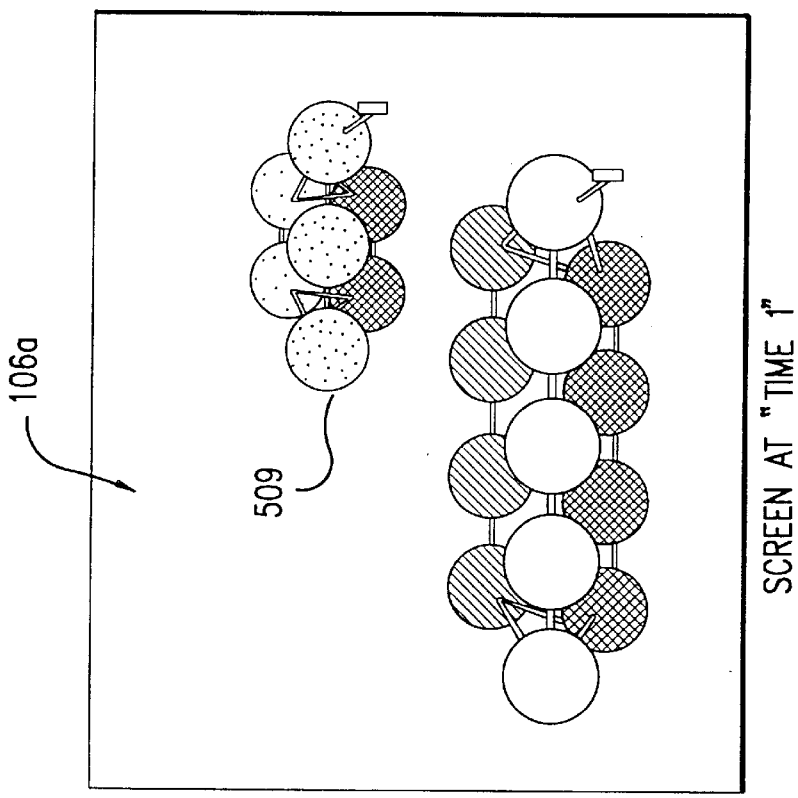
Figure 5C:
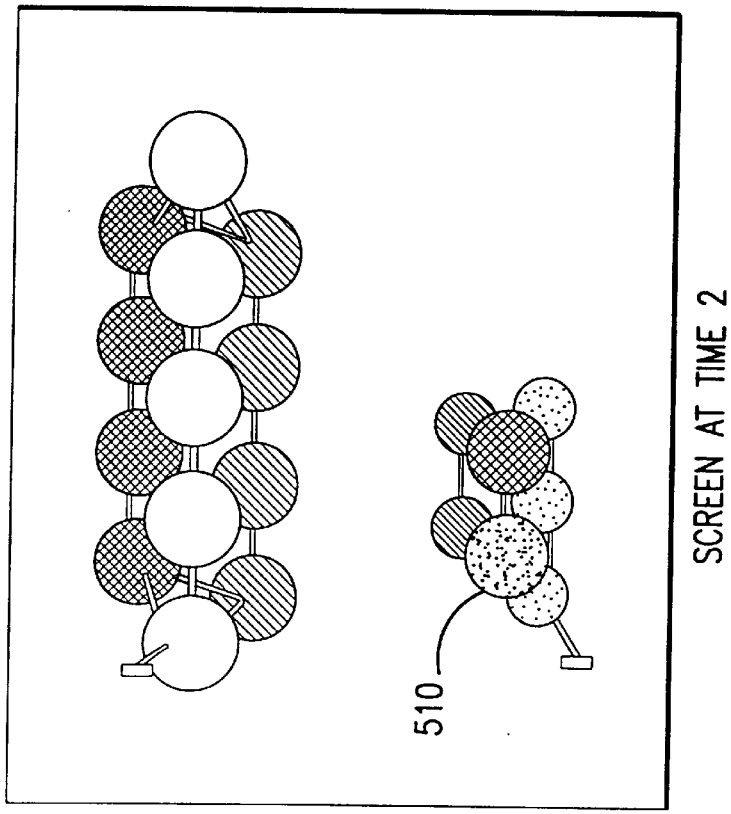
FIG. 5c is a diagram of another pair of exemplary computer-screen displays illustrating the animated, three-dimensional nature of the panorama generated by the navigational system according to the present invention.
Figure 5C:
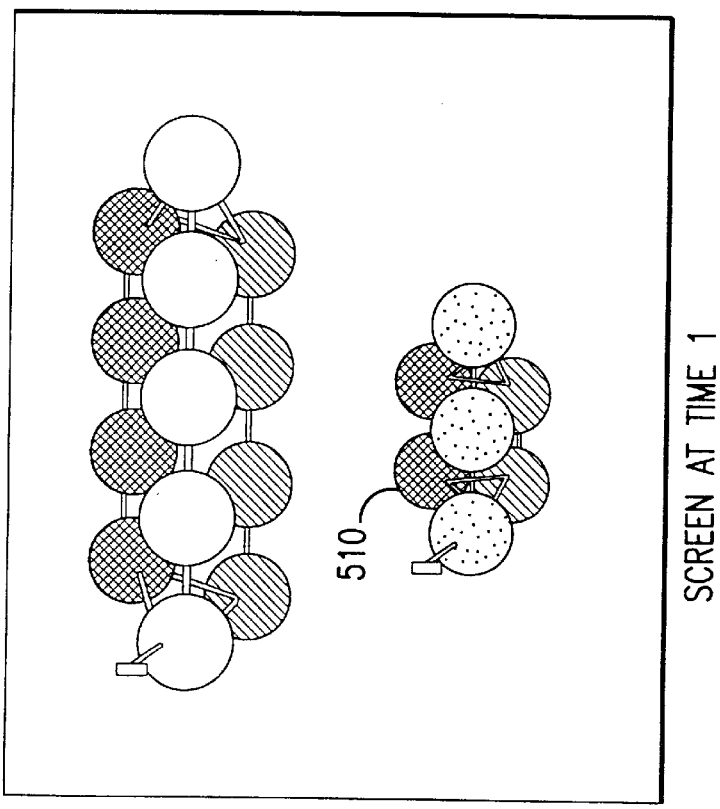
Figure 5D:
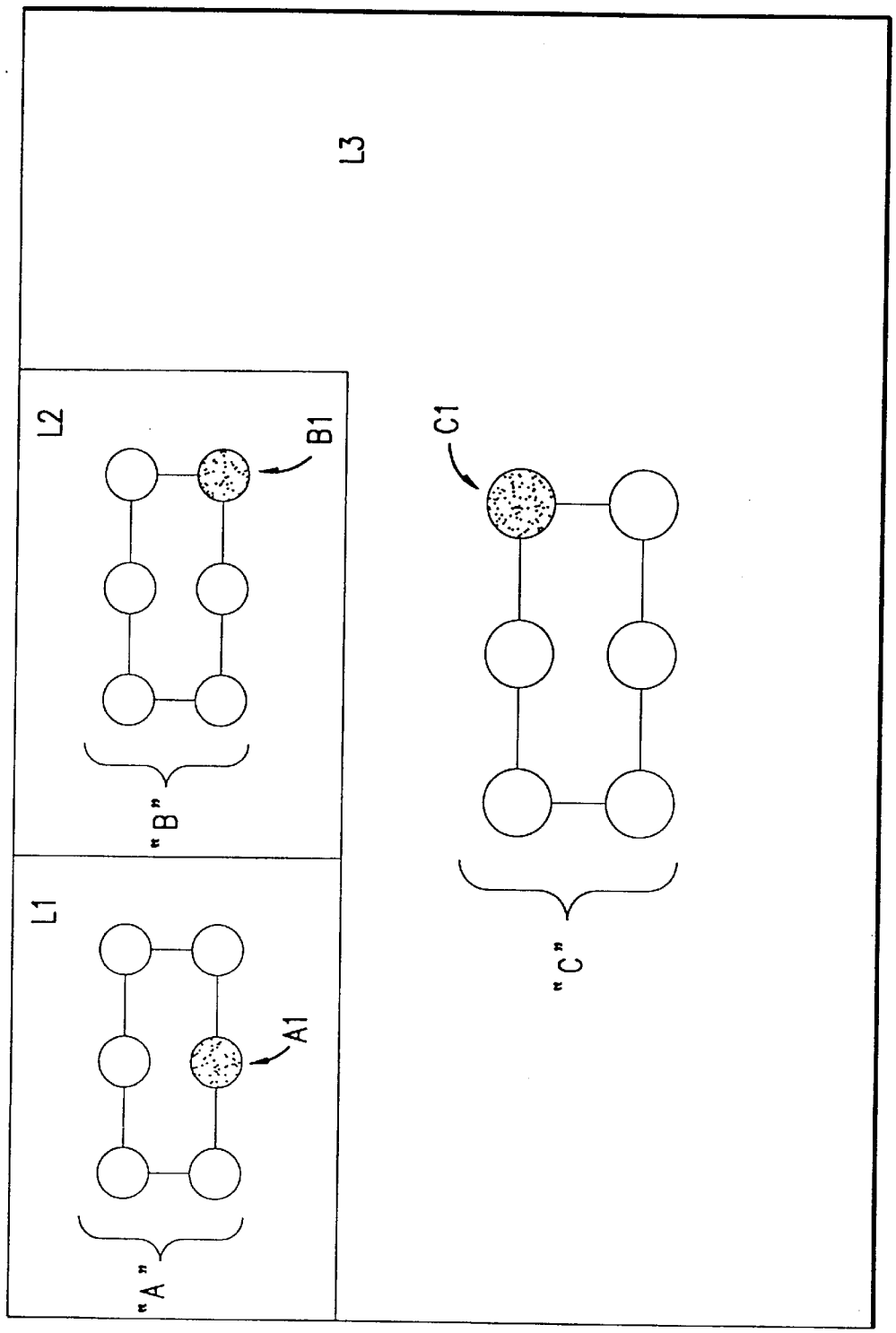
FIG. 5d is a diagram of an exemplary computer-screen display illustrating information "molecules" organized in three hierarchical levels.

The dynamic, animated nature of the panorama is explained in connection with FIGS. 5b and 5c. As shown by the left panel in FIG. 5b, the main display area 106a of a computer screen shows two molecules at "time 1." Once the user selects the node 509, for example, the panorama will change, and the molecule containing the chosen node 509 will rotate to the foreground of the panorama, thereby resulting in the panorama illustrated by the right panel of FIG. 5b labeled "screen at 'time 2.'" Similarly, as shown in FIG. 5c, if the user selects a node in a background thread of a molecule, e.g., node 510 in the left panel of FIG. 5c, the molecule will be rotated to show the selected node in the foreground of the panorama, as shown in the right panel of FIG. 5c. Furthermore, the PNS software 102 provides a "visited node" function, whereby previously visited nodes of a thread are indicated to the user by means of slightly different shade color from the other nodes of the thread.

Figure 19:
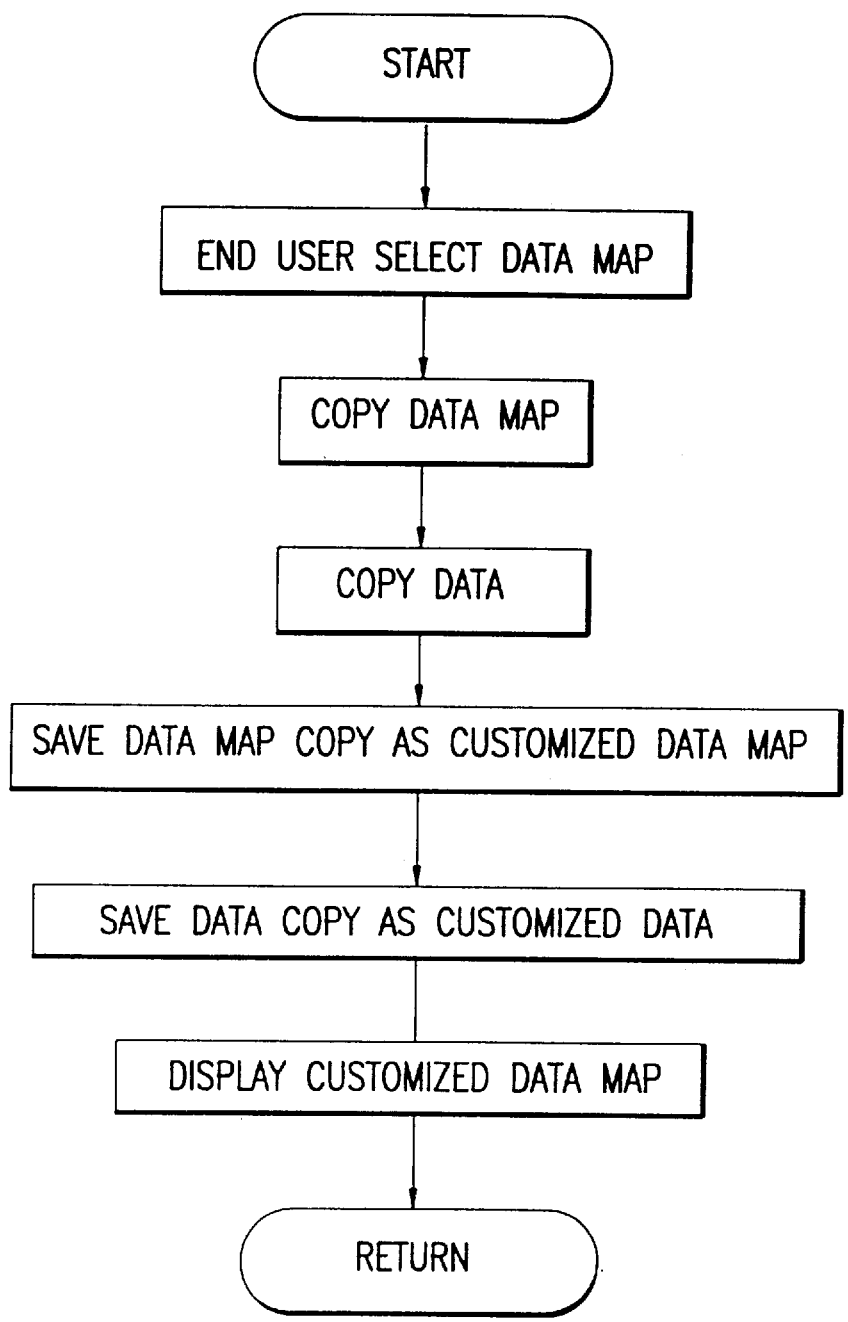
FIG. 19 is a flow chart illustrating the logic sequence involved in customizing the graphic display of the structural organization of a database using the navigational system according to the present invention.

The PNS software 102 allows the users to "customize" the panorama, i.e., modify the graphical representation of the organizational structure of the database 104, as well as copy and modify existing units of information contained in the database. First, the natural left-to-right progression of nodes in a given thread may be customized to a right-to-left progression. Furthermore, the user may define one or more custom navigational "paths" over the database by selecting appropriate elements of the data base, or by altering a path originally provided with the information base. For example, the user can select, arrange, and save nodes, threads, and/or any portion of the panorama as parts of new threads or molecules that are separate from the threads or molecules of the original panorama representation of the database 104. The customization logic may be as shown in FIG. 19.

The user may also choose to have the navigational system according to the present invention automatically create a customized path. The "automatic customization" is achieved by allowing the navigational system to record the node/thread selections made by the user when accessing the hypermedia database 104. The customized path then may be saved for future use. Once a customized path has been created for the hypermedia database 104, the customized path can be used to access another similarly structured database, e.g., a new issue of a CD-ROM magazine.

Amongst numerous areas of potential application for the navigational system according to the present invention, a very natural application is for navigation of on-line information services. For on-line navigation of a "web page," for example, the PNS software 102 may organize the available information of a given on-line network in such a manner that the entire network would be represented by one or more first-level hierarchy molecule(s), and each node of the first-level molecule(s) would represent a web site. Each first-level node, or each web site, would be represented, in turn, by one or more second-level hierarchy molecule(s), and each node of the second-level molecule(s) would be a web page.

Figure 3B:
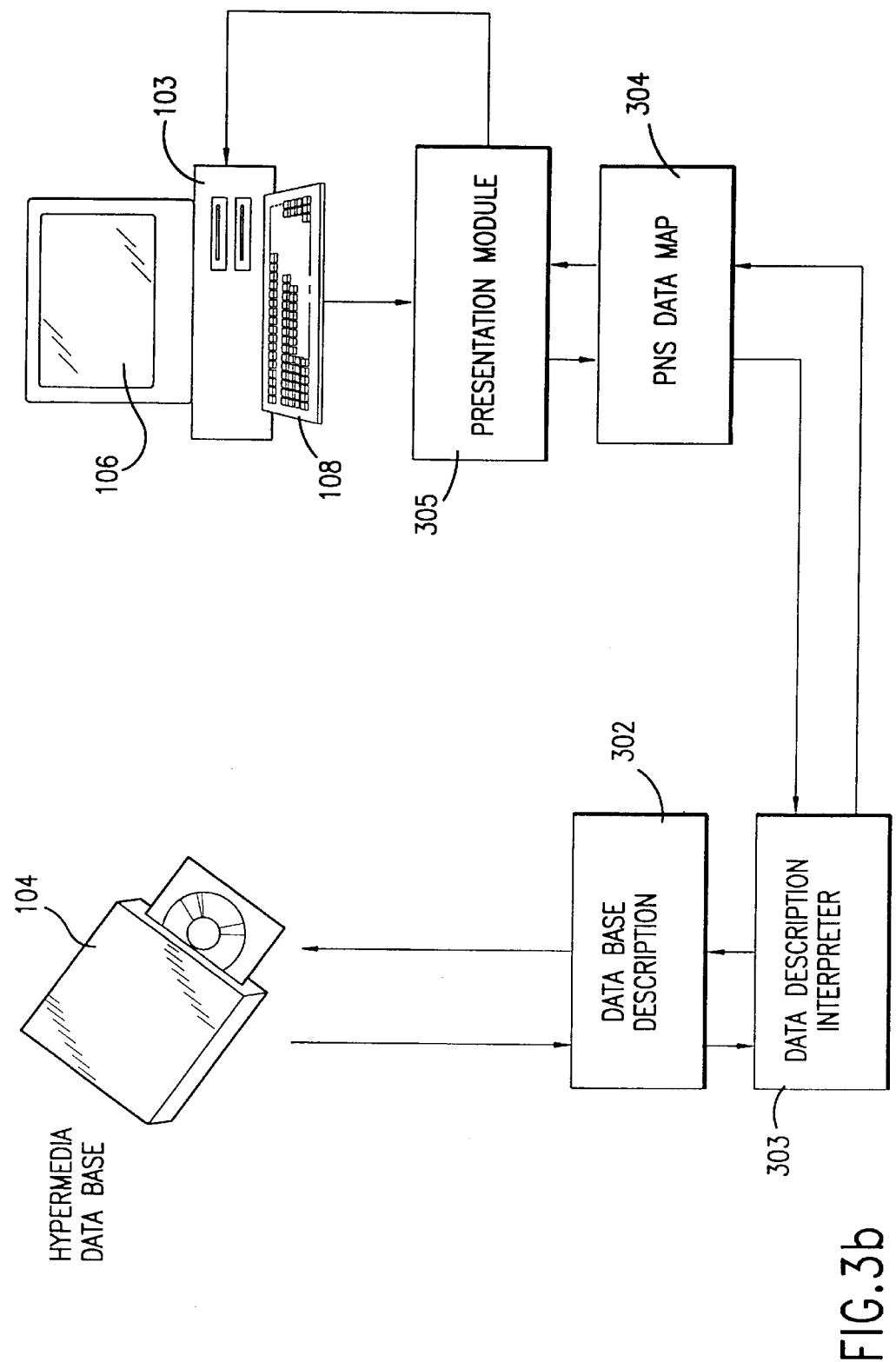
FIG. 3b is a block diagram of another representative embodiment of the software architecture of the navigational system according to the present invention.

As shown in FIG. 3, the program architecture of the PNS software 102 includes a database description module 302, a data description interpreter module 303, a data map 304, and a presentation module 305. The database description module 302 consists of a high-level description of the hypermedia database's elements and their relationships. The data description interpreter module 303 is a program module which creates the data map 304. The data map 304 is a coded object reflecting the structure of the hypermedia database 104. The presentation module 305 is responsible for displaying the PNS "panorama" and implementing various functions and navigational features of the PNS. The presentation module 305 uses the data map 304 for run-time navigation of the hypermedia database 104.

The program architecture of the PNS software 102 may also include a database description constructor 301a, which is shown in FIG. 3a. The database description constructor 301, also referred to as a "molecule author," is an optional module for providing the description of the structure of the hypermedia database 104, i.e., constructing the database description module 302. The database description constructor 301a, which may be used for describing a database containing information units which have not been assigned identifying labels, or "tags," is a graphical user interface (GUI) which allows the person seeking to organize the "untagged" database to assign an identifying label for each information unit, e.g., an element, a node, a thread and a molecule.

Figure 3C:
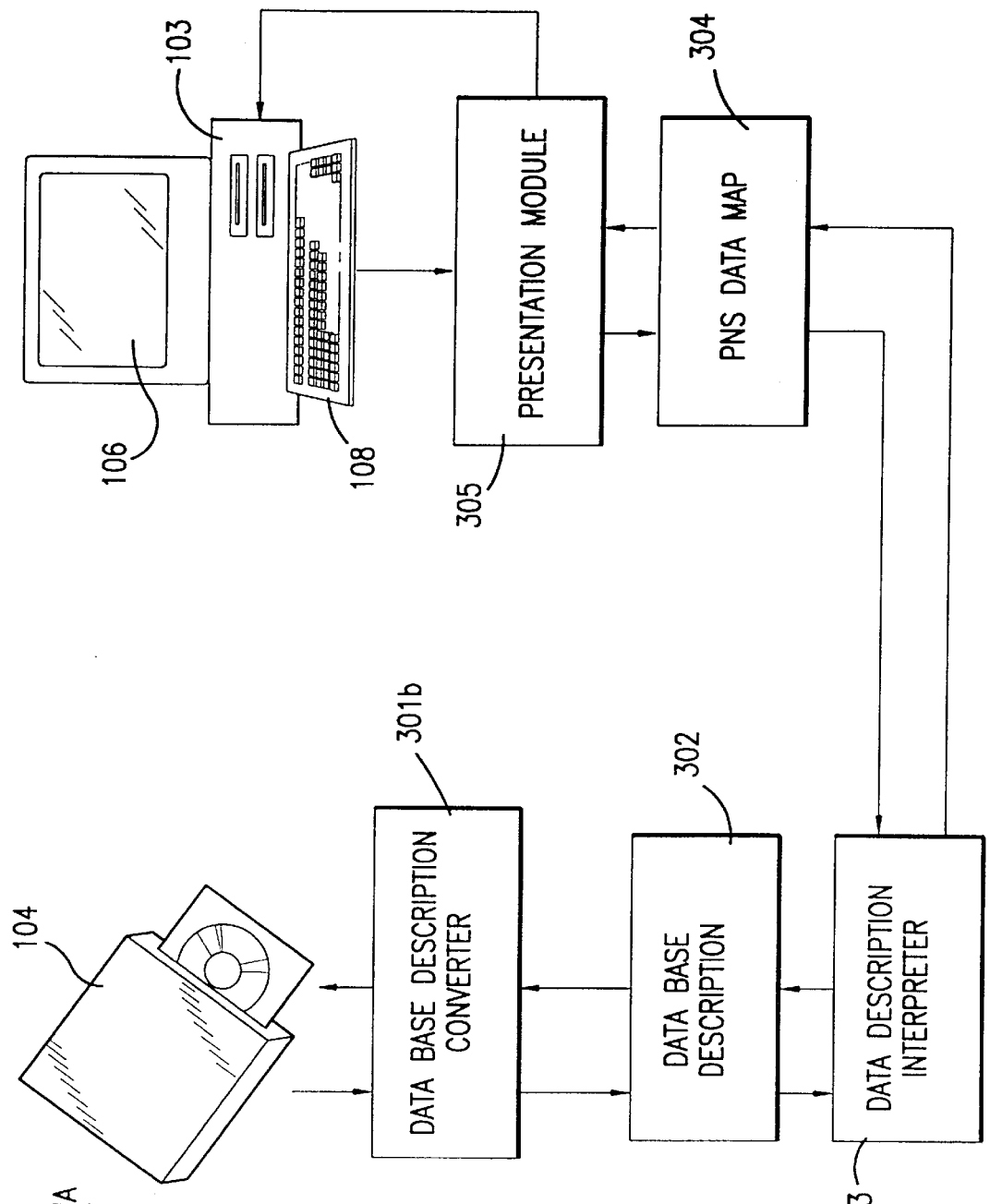
FIG. 3c is a block diagram of yet another representative embodiment of the software architecture of the navigational system according to the present invention.

The database description module 302 may be created also by utilizing a database description convertor module 301b, which is shown in FIG. 3c. The database description convertor module 301b is a computer program module capable of creating the database description module 302 for a given database from software structures derived from the given database. For example, the database description convertor module 301b may utilize the following structures to create the database description module: the index structure of data stored in a relational data base management system (DBMS); the directory structure of the operating system; or utilizing a parameterized scan of a database with a search engine. The database description converter 301b or the database description constructor 301a may be provided for: popular word processing packages; commonly used spreadsheet packages; and Internet browser packages, just to name a few.

Once the database description module 302 of the hypermedia database 104 has been generated by, for example, a person using the database description constructor module (the molecule author) 301a, the description module 302 is subsequently read by the data description interpreter module 303 to generate the corresponding PNS data map 304. The data map 304 is in turn used by the presentation module 305 to generate the panorama corresponding to the database 104 and facilitate run-time navigation of the database 104. The data description interpreter module 303, the data map 304 and the presentation module 305 of the system according to the present invention may be collectively called a "molecule reader." The mechanics of organizing, or "tagging," the component information units of the database 104, as well as the mechanics of reading the "tagged" information units, are explained below in connection with the molecule author 301a and the molecule reader.

Before the user of the database description constructor 301a proceeds to tag the component information units of the database 104, the user will have examined the information content of the database 104 and determined the specific number of hierarchical organization levels which the tagged database will incorporate. Assuming that there are 1,008,000 "elements" in a given database, one possible way of organizing this number of elements is in three levels of hierarchy. Level 1, or "L1," the highest level of organization, may be organized into two molecules each having five threads, with each thread having seven nodes. This would result in 70 different L1 node labels, or categories. Level 2, or "L2," molecules are in turn encompassed within L1 nodes. Each L1 node may be organized into five L2 molecules each having ten threads, with each thread having twelve nodes, resulting in 600 L2 node labels, or categories. Level 3, or "L3" molecules are in turn encompassed within the L2 nodes, and each L2 node may contain one L3 molecule having three threads, with each thread having four nodes, and each node having two elements, resulting in 24 L3 node categories. Accordingly, the 1,008,000 database "elements" would be organized into 70 L1 categories, 600 L2 categories for each L1 category, and 24 L3 categories for each L2 category. For each level of hierarchy, a molecule represents a given concept, the thread represents a given subject area within a given concept, the node represents a given category of the given subject area, and the element represents a subcategory of the given category. For higher levels of hierarchy, e.g., L2 and L1 levels, the "elements" contained in each "node" would be molecules of immediate lower level.

Figure 20:
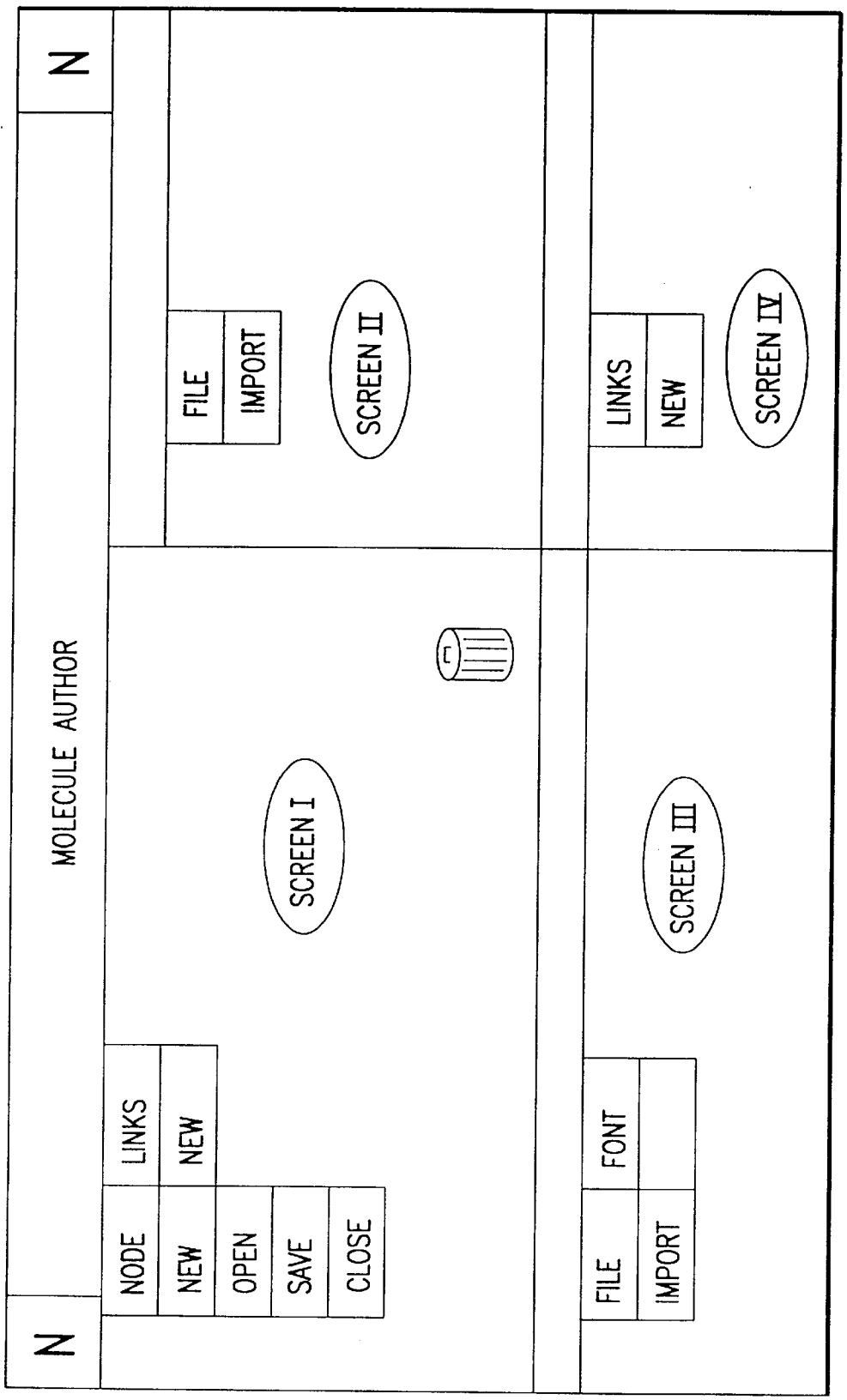
FIG. 20 is a diagram of an exemplary computer-screen display illustrating the graphic user interface generated by the "molecule author" module of the navigational system according to the present invention.

The database description constructor (molecule author) 301a illustrated in FIGS. 3a provides a graphical user interface (GUI) illustrated in FIG. 20. When initialized, the molecule author module 301a will prompt the user to input certain parameters to control the size and complexity of each L1, L2 and L3 level organization. The size/complexity parameters are part of the "rules of data organization." Assuming the above-described example of the database containing 1,008,000 elements, the user's response with respect to the size/complexity parameters of L1 and L2 levels will correspond to the proposed organization of L1 and L2. For L1 level, there may be two molecules, and each molecule may have up to five threads, and each thread may have up to seven nodes. For L2 level, there may be a maximum of five L2 molecules in each L1 node, i.e., in each L2 panorama corresponding to each L1 node, and each molecule may have up to ten threads, and each thread may have twelve nodes. For L3 level, each molecule may have three threads, with each thread having four nodes, and each node having two elements. In addition, the user's input will also include parameters defining the maximum number of L3 elements in each L3 panorama, and in the entire database, to which a given L3 element may be linked.

Once the size/complexity parameters have been inputted, the GUI of the database description constructor 301a will prompt the user to establish a label for each one of the 70 L1 nodes and 600 L2 nodes. When the L1 and L2 labels have been set, the GUI of the database description constructor 301a would feature a menu, identified in FIG. 20 with the legend "Screen 1." Using the above example of organizing a database containing 1,008,000 elements into three hierarchical levels, the user, or "tagger," selects the "NODE" item, followed by the "NEW" item, in the "Screen 1" menu. A prompt would then appear on the screen asking the tagger to select a color for the new node, to which request the tagger may choose blue, for example, corresponding to the thread ID. At this point, the tagger would be tagging an L3 node which, when the tagging process is finished, will contain a collection of database "elements," the smallest unit of information organization in the tagged database. The tagger proceeds to "Screen II" menu, shown in FIG. 20, and designates one or more audio or video file(s) as element(s) of the current node. Next, the tagger proceeds to "Screen III" menu, also shown in FIG. 20, and designates one or more text file(s) as element(s) of the current node. Each element would be assigned an element label. Subsequently, the tagger proceeds to "Screen IV" menu, shown in FIG. 20, and designates the labels of any other elements to which the elements of the current node are "linked." Once the tagger is finished designating all the elements of the current L3 node, the tagger would assign a node label for the current L3 node.

The above-described process of tagging (or "formatting") the database one L3 node at a time, by designating the component elements of the current node and labeling the node, is repeated until the tagger has completed an L3 structural organization encompassed within an L2 node. Once again referring to the above example of the database containing 1,008,000 elements, the L3 organization for a typical L2 node would be one L3 molecule having three threads, with each thread having four nodes, and each node having, on the average, two elements. This organization would depend on the size/complexity parameters inputted in the beginning stages of the operation of the molecule author 301a. Assuming the previously-described size/complexity parameters to have been incorporated into the molecule author 301a, if the user has already labeled four blue nodes in a linear progression, the molecule author module 301a will not allow the user to place a fifth blue node in the linear progression. Similarly, the number of colors, corresponding to thread designations, will be limited to three. If the user attempts to add a fourth thread (color) to a given L3 molecule, the user would be forced to incorporate the fourth thread as a part of a second L3 molecule. Similar restrictions may apply to designation of "linked" elements, whereby the user is limited to designating, at the most, a finite number of linked elements. The completed L3 organization for the given L2 node would be assigned an L2 node label chosen from the list of 600 pre-set L2 node labels, as well as an L1 node label selected from the list of 70 pre-set L1 node labels.

In the above example of "tagging" a database containing 1,008,000 elements using the molecule author 301a, it is possible that the tagger will not use all 600 L2 labels and 70 L1 labels in tagging the entire database. This result is possible because the size/complexity parameters for the organization of L1 and L2 do not specify the exact number of "elements" which must be contained in each node of L1 and L2 organization. For example, if the rules of data organization allow three "elements" per each L2 level node, the user of the molecule author may format three successive L3 level panoramas each consisting of one molecule, and each L3 level panorama may be assigned to the same L2 node chosen from the list of 600 L2 node labels possible for a given L1 node. Alternatively, the user of the molecule author may decide to assign only one L3 level molecule to a given L2 node. Accordingly, a given L2 node may contain varying number of "elements," i.e., L3 molecules. Similarly, L1 nodes may contain varying number of "elements," i.e., L2 molecules.

Once the entire database has been tagged, each "element" may be viewed as having a unique tag in the form of L1(m,t,n)L2(m,t,n)L3(m,t,n,e), where "m," "t," "n," and "e" represent unique identifiers for a molecule, a thread, a node, and an element, respectively, of corresponding L1, L2 or L3 hierarchical level. In the representative embodiment of the present invention, the unique identifiers for molecules, threads, nodes, and elements are numbers. As will be explained in greater detail below, the process of tagging component information units of the database corresponds to selecting "data description statements" which define the component information units.

The result of the above-described tagging process is the database description module 302, which identifies the component information units of the hypermedia database 104 as well as the relationships amongst these component information units, consists of multiple "data description statements." A set of data description statements, examples of which are defined below, are provided in the representative embodiment of the PNS software 102. A "DEFINE ELEMENT" statement defines a data element, such as a file containing text, audio or visual information. A "DEFINE NODE" statement defines a node, i.e., a collection of elements. A "DEFINE THREAD" statement defines a thread, i.e., a collection of nodes. A "DEFINE MOLECULE" statement defines a molecule, a collection of threads.

In the representative embodiment of the PNS software 102, the PNS data description statements are provided with the syntax as shown in Tables 1–11 below. Tables 1–11 shown below presupposes that the organizational structure of the database includes three hierarchical levels, levels L1, L2 and L3, wherein level L3 is the lowest level, i.e., the most specific organizational level, and level L1 is the highest level, i.e., the most general organizational level.

TABLE 1

"DEFINE ELEMENT" STATEMENT

| T.1.1 | DEFINE ELEMENT |
| T.1.2 | element_id |
| T.1.3 | L3 NODE ID L3 node_id |
| T.1.4 | PREVIOUS ELEMENT ID element_id |
| T.1.5 | NEXT ELEMENT ID element_id |
| T.1.6 | OBJECT TYPE object_type |
| T.1.7 | OBJECT FORMAT object_format |
| T.1.8 | OBJECT NAME object_name |
| T.1.9 | OBJECT LENGTH object_length |
| T.1.10 | DESCRIPTION text |
| T.1.11 | LINK ELEMENT ID element_id |

As shown in Table 1, the first component, T.1.1, of the "DEFINE ELEMENT" statement is the statement identification, "DEFINE ELEMENT," which is required. The next component, T.1.2, "element_id," is a unique element identifier for the element at hand, which identifier may be supplied by the user or system-generated. Component T.1.3 includes "L3 NODE ID," which is a required keyword, and "L3 node_id," which denotes the node ID of the L3 node to which the element at hand belongs. Component T.1.4 includes "PREVIOUS ELEMENT ID," which is a required keyword, and "element_id," which specifies the element ID of the previous element within the node presentation sequence. Component T.1.5 includes "NEXT ELEMENT ID," which is a required keyword, and "element_id," which specifies the element ID of the next element within the node presentation sequence.

Continuing with the syntax of the "DEFINE ELEMENT" statement shown in Table 1, component T.1.6 includes "OBJECT TYPE," which is a required keyword, and "object_type," which denotes the particular object type, e.g., text, audio, or video. Component T.1.7 includes "OBJECT FORMAT," which is a required keyword, and "object_format," which denotes the particular object format, e.g., text, Windows Waveform (WAV), uncompressed video (RAW), or Moving Pictures Expert Group (MPEG). WAV is an audio file format, and MPEG is the international standard for digital video and audio compression. Component T.1.8 includes "OBJECT NAME," which is a required keyword, and "object_name," which denotes the particular object name, e.g., a file name. Component T.1.9 includes "OBJECT LENGTH," which is a required keyword, and "object_length," which denotes the particular object length. The "object_length" of component T.1.9 may be one of the following: "FILE," specifying the entire file; "PAGES n," where n is the number of text pages; "FRAMES n," where n is number of video frames; "SAMPLES n," where n is the number of audio samples; and "SECONDS n," where n is the presentation duration in seconds. Component T.1.10 includes "DESCRIPTION," which is a required keyword, and "text," an element description text which may be displayed during the element presentation.

TABLE 2

"DEFINE L3 NODE" STATEMENT

| T.2.1 | DEFINE L3 NODE |
| T.2.2 | L3 node_id |
| T.2.3 | L3 THREAD ID L3 thread_id |
| T.2.4 | PREVIOUS L3 NODE ID L3 node_id |
| T.2.5 | NEXT L3 NODE ID L3 node_id |
| T.2.6 | NUMBER OF ELEMENTS elements_number |
| T.2.7 | FIRST ELEMENT ID element_id |

TABLE 2-continued

"DEFINE L3 NODE" STATEMENT

| T.2.8 | LAST ELEMENT ID element_id |
| T.2.9 | DESCRIPTION text |

As shown in Table 2, the first component, T.2.1, of the "DEFINE L3 NODE" statement is the statement identification, "DEFINE L3 NODE," which is required. The next component, T.2.2, "L3 node_id," is a unique node identifier for the L3 node at hand, which identifier may be either supplied by the user or system-generated. The next component, T.2.3, includes "L3 THREAD ID," which is a required keyword, and "L3 thread_id," which specifies the thread ID of the L3 thread to which the L3 node at hand belongs. Component T.2.4 includes "PREVIOUS L3 NODE ID," which is a required keyword, and "L3 node_id," which specifies the node ID of the previous L3 node within the thread, or the presentation sequence of nodes. Component T.2.5 includes "NEXT L3 NODE ID," which is a required keyword, and "L3 node_id," which specifies the node ID of the next L3 node within the thread. Component T.2.6 includes "NUMBER OF ELEMENTS," which is a required keyword, and "elements_number," which specifies the number of elements contained in the L3 node at hand. Component T.2.7 includes "FIRST ELEMENT ID," which is a required keyword, and "element_id," which specifies the element ID of the first element contained in the L3 node at hand. Component T.2.8 includes "LAST ELEMENT ID," which is a required keyword, and "element_id," which specifies the element ID of the last element contained in the L3 node at hand. Component T.2.9 includes "DESCRIPTION," which is a required keyword, and "text," which is a node description text that may be displayed during the presentation of the L3 node being examined.

TABLE 3

"DEFINE L3 THREAD" STATEMENT

| T.3.1 | DEFINE L3 THREAD |
| T.3.2 | L3 thread_id |
| T.3.3 | L3 MOLECULE ID L3 molecule_id |
| T.3.4 | NUMBER OF L3 NODES L3 nodes_number |
| T.3.5 | FIRST L3 NODE ID L3 node_id |
| T.3.6 | LAST L3 NODE ID L3 node_id |
| T.3.7 | DESCRIPTION text |

As shown in Table 3, the first component, T.3.1, of the "DEFINE L3 THREAD" statement is the statement identification, "DEFINE L3 THREAD," which is required. The next component, T.3.2, "L3 thread_id," is a unique thread identifier for the L3 thread at hand, which identifier may be either supplied by the user or system-generated. Component T.3.3 includes "L3 MOLECULE ID," which is a required keyword, and "L3 molecule_id," which is a unique molecule identifier for the L3 molecule containing the L3 thread at hand. Component T.3.4 includes "NUMBER OF L3 NODES," which is a required keyword, and "L3 nodes_number," which specifies the number of L3 nodes contained in the L3 thread at hand. Component T.3.5 includes "FIRST L3 NODE ID," which is a required keyword, and "L3 node_id," which is the node identifier for the first L3 node of the thread at hand. Component T.3.6 includes "LAST L3 NODE ID," which is a required keyword, and "L3 node_id," which specifies the node identifier for the last L3 node of the thread at hand. Component T.3.7 includes "DESCRIPTION," which is a required keyword, and "text," which is a thread-description text that may be displayed during the presentation of the L3 thread at hand.

TABLE 4

"DEFINE L3 MOLECULE" STATEMENT

| T.4.1 | DEFINE L3 MOLECULE |
| T.4.2 | L3 molecule_id |
| T.4.3 | L2 NODE ID L2 node_id |
| T.4.4 | NUMBER OF L3 THREADS L3 threads_number |
| T.4.5 | DESCRIPTION text |

As shown in Table 4, the first component, T.4.1, of the "DEFINE L3 MOLECULE" statement is the statement identification, "DEFINE L3 MOLECULE," which is required. The next component, T.4.2, "L3 molecule_id," is a unique molecule identifier for the L3 molecule at hand, which identifier may be either supplied by the user or system-generated. The next component, T.4.3, includes "L2 NODE ID," which is a required keyword, and "L2 node_id," which specifies a unique node identifier for the L2 node to which the L3 molecule at hand belongs. Component T.4.4 includes "NUMBER OF L3 THREADS," which is a required keyword, and "L3 threads_number," which specifies the number of L3 threads contained in the L3 molecule at hand. Component T.4.5 includes "DESCRIPTION," which is a required keyword, and "text," which is a molecule-description text that may be displayed during the presentation of the L3 molecule at hand.

TABLE 5

"DEFINE L2 NODE" STATEMENT

| T.5.1 | DEFINE L2 NODE |
| T.5.2 | L2 node_id |
| T.5.3 | L2 THREAD ID L2 thread_id |
| T.5.4 | PREVIOUS L2 NODE ID L2 node_id |
| T.5.5 | NEXT L2 NODE ID L2 node_id |
| T.5.6 | NUMBER OF L3 MOLECULES L3 molecules_number |
| T.5.7 | DESCRIPTION text |

As shown in Table 5, the first component, T.5.1, of the "DEFINE L2 NODE" statement is the statement identification, "DEFINE L2 NODE," which is required. The next component, T.5.2, "L2 node_id," is a unique node identifier for the L2 node at hand, which identifier may be either supplied by the user or system-generated. The next component, T.5.3, includes "L2 THREAD ID," which is a required keyword, and "L2 thread_id," which specifies the thread ID of the L2 thread to which the L2 node at hand belongs. Component T.5.4 includes "PREVIOUS L2 NODE ID," which is a required keyword, and "L2 node_id," which specifies the node ID of the previous L2 node within the thread. Component T.5.5 includes "NEXT L2 NODE ID," which is a required keyword, and "L2 node_id," which specifies the node ID of the next L2 node within the thread. Component T.5.6 includes "NUMBER OF L3 MOLECULES," which is a required keyword, and "L3 molecules_number," which specifies the number of L3 molecules contained in the L2 node at hand. Component T.5.7 includes "DESCRIPTION," which is a required keyword, and "text," which is a node description text that may be displayed during the presentation of the L2 node being examined.

TABLE 6

"DEFINE L2 THREAD" STATEMENT

| T.6.1 | DEFINE L2 THREAD |
| --- | --- |
| T.6.2 | L2 thread_id |
| T.6.3 | L2 MOLECULE ID L2 molecule_id |
| T.6.4 | NUMBER OF L2 NODES L2 nodes_number |
| T.6.5 | FIRST L2 NODE ID L2 node_id |
| T.6.6 | LAST L2 NODE ID L2 node_id |
| T.6.7 | DESCRIPTION text |

As shown in Table 6, the first component, T.6.1, of the "DEFINE L2 THREAD" statement is the statement identification, "DEFINE L2 THREAD," which is required. The next component, T.6.2, "L2 thread_id," is a unique thread identifier for the L2 thread at hand, which identifier may be either supplied by the user or system-generated. Component T.6.3 includes "L2 MOLECULE ID," which is a required keyword, and "L2 molecule_id," which is a unique molecule identifier for the L2 molecule containing the L2 thread at hand. Component T.6.4 includes "NUMBER OF L2 NODES," which is a required keyword, and "L2 nodes_number," which specifies the number of L2 nodes contained in the L2 thread at hand. Component T.6.5 includes "FIRST L2 NODE ID," which is a required keyword, and "L2 node_id," which specifies the node identifier for the first L2 node of the thread at hand. Component T.6.6 includes "LAST L2 NODE ID," which is a required keyword, and "L2 node_id," which specifies the node identifier for the last L2 node of the thread at hand. Component T.6.7 includes "DESCRIPTION," which is a required keyword, and "text," which is a thread-description text that may be displayed during the presentation of the L2 thread at hand.

TABLE 7

"DEFINE L2 MOLECULE" STATEMENT

| T.7.1 | DEFINE L2 MOLECULE |
| --- | --- |
| T.7.2 | L2 molecule_id |
| T.7.3 | L1 NODE ID L1 node_id |
| T.7.4 | NUMBER OF L2 THREADS L2 threads_number |
| T.7.5 | DESCRIPTION text |

As shown in Table 7, the first component, T.7.1, of the "DEFINE L2 MOLECULE" statement is the statement identification, "DEFINE L2 MOLECULE," which is required. The next component, T.7.2, "L2 molecule_id," is a unique molecule identifier for the L2 molecule at hand, which identifier may be either supplied by the user or system-generated. The next component, T.7.3, includes "L1 NODE ID," which is a required keyword, and "L1 node_id," which specifies a unique node identifier for the L1 node to which the L2 molecule at hand belongs. Component T.7.4 includes "NUMBER OF L2 THREADS," which is a required keyword, and "L2 threads_number," which specifies the number of L2 threads contained in the L2 molecule at hand. Component T.7.5 includes "DESCRIPTION," which is a required keyword, and "text," which is a molecule-description text that may be displayed during the presentation of the L2 molecule at hand.

TABLE 8

"DEFINE L1 NODE" STATEMENT

| T.8.1 | DEFINE L1 NODE |
| --- | --- |
| T.8.2 | L1 node_id |
| T.8.3 | L1 THREAD ID L1 thread_id |
| T.8.4 | PREVIOUS L1 NODE ID L1 node_id |
| T.8.5 | NEXT L1 NODE ID L1 node_id |
| T.8.6 | NUMBER OF L2 MOLECULES L2 molecules_number |
| T.8.7 | DESCRIPTION text |

As shown in Table 8, the first component, T.8.1, of the "DEFINE L1 NODE" statement is the statement identification, "DEFINE L1 NODE," which is required. The next component, T.8.2, "L1 node_id," is a unique node identifier for the L1 node at hand, which identifier may be either supplied by the user or system-generated. The next component, T.8.3, includes "L1 THREAD ID," which is a required keyword, and "L1 thread_id," which specifies the thread ID of the L1 thread to which the L1 node at hand belongs. Component T.8.4 includes "PREVIOUS L1 NODE ID," which is a required keyword, and "L1 node_id," which specifies the node ID of the previous L1 node within the thread. Component T.8.5 includes "NEXT L1 NODE ID," which is a required keyword, and "L1 node_id," which specifies the node ID of the next L1 node within the thread. Component T.8.6 includes "NUMBER OF L2 MOLECULES," which is a required keyword, and "L2 molecules_number," which specifies the number of L2 molecules contained in the L1 node at hand. Component T.8.7 includes "DESCRIPTION," which is a required keyword, and "text," which is a node description text that may be displayed during the presentation of the L1 node being examined.

TABLE 9

"DEFINE L1 THREAD" STATEMENT

| T.9.1 | DEFINE L1 THREAD |
| --- | --- |
| T.9.2 | L1 thread_id |
| T.9.3 | L1 MOLECULE ID L1 molecule_id |
| T.9.4 | NUMBER OF L1 NODES L1 nodes_number |
| T.9.5 | FIRST L1 NODE ID L1 node_id |
| T.9.6 | LAST L1 NODE ID L1 node_id |
| T.9.7 | DESCRIPTION text |

As shown in Table 9, the first component, T.9.1, of the "DEFINE L1 THREAD" statement is the statement identification, "DEFINE L1 THREAD," which is required. The next component, T.9.2, "L1 thread_id," is a unique thread identifier for the L1 thread at hand, which identifier may be either supplied by the user or system-generated. Component T.9.3 includes "L1 MOLECULE ID," which is a required keyword, and "L1 molecule_id," which specifies a unique molecule identifier for the L1 molecule containing the L1 thread at hand. Component T.9.4 includes "NUMBER OF L1 NODES," which is a required keyword, and "L1 nodes_number," which specifies the number of L1 nodes contained in the L1 thread at hand. Component T.9.5 includes "FIRST L1 NODE ID," which is a required keyword, and "L1 node_id," which specifies the node identifier for the first L1 node of the thread at hand. Component T.9.6 includes "LAST L1 NODE ID," which is a required keyword, and "L1 node_id," which specifies the node identifier for the last L1 node of the thread at hand. Component T.9.7 includes "DESCRIPTION," which is a required keyword, and "text," which is a thread-description text that may be displayed during the presentation of the L1 thread at hand.

TABLE 10

"DEFINE L1 MOLECULE" STATEMENT

| T.10.1 | DEFINE L1 MOLECULE |
|---|---|
| T.10.2 | L1 molecule_id |
| T.10.3 | PRESENTATION ID presentation_id |
| T.10.4 | NUMBER OF L1 THREADS L1 threads_number |
| T.10.5 | DESCRIPTION text |

As shown in Table 10, the first component, T.10.1, of the "DEFINE L1 MOLECULE" statement is the statement identification, "DEFINE L1 MOLECULE," which is require d . The next component, T.10.2, "L1 molecule_id," is a unique molecule identifier for the L1 molecule at hand, which identifier may be either supplied by the user or system-generated. The next component, T.10.3, includes "PRESENTATION ID," which is a required keyword, and "presentation_id," which specifies a unique presentation identifier for the presentation to which the L1 molecule at hand belongs. Component T.10.4 includes "NUMBER OF L1 THREADS," which is a required keyword, and "L1 threads_number," which specifies the number of L1 threads contained in the L1 molecule at hand. Component T.10.5 includes "DESCRIPTION," which is a required keyword, and "text," which is a molecule-description text that may be displayed during the presentation of the L1 molecule at hand.

TABLE 11

"DEFINE PANORAMA" STATEMENT

| T.11.1 | DEFINE PANORAMA |
|---|---|
| T.11.2 | panorama_id |
| T.11.3 | NUMBER OF L1 MOLECULES L1 molecules_number |
| T.11.4 | DESCRIPTION text |

As shown in Table 11, the first component, T.11.1, of the "DEFINE PANORAMA" statement is the statement identification, "DEFINE PANORAMA," which is required. The next component, T.11.2, "panorama_id," is a unique molecule identifier for the panorama at hand, which identifier may be either supplied by the user or system-generated. The next component, T.11.3, includes "NUMBER OF L1 MOLECULES," which is a required keyword, and "L1 molecules_number," which specifies the number of L1 molecules included in the panorama at hand. Component T.11.4 includes "DESCRIPTION," which is a required keyword, and "text," which is a panorama-description text that may be displayed during the presentation of the panorama at hand.

The above-described data description statements correspond to the identifying tags, or labels, chosen by the user of the database description constructor 301a. As described above, each "element" may be viewed as having a unique tag in the form of L1(m,t,n)L2(m,t,n)L3(m,t,n,e), where "m," "t," "n," and "e" represent unique identifiers for a molecule, a thread, a node, and an element, respectively, of corresponding hierarchical level. By selecting an L1 tag, for example, during the tagging process, the user of the database description constructor 301a selects the corresponding "DEFINE L1 MOLECULE STATEMENT," "DEFINE L1 THREAD STATEMENT," and "DEFINED L1 NODE STATEMENT." Choosing an L2 or L3 tag would similarly select the associated set of data description statements for the chosen tag.

After a given database has been tagged using the molecule author 301a, the "molecule reader" is utilized to generate the actual graphic representation of the organizational structure of the given database. Once initialized, the molecule reader utilizes a standard search mechanism to read the labels of each element in the tagged database. Again referring to the previously described example of the database containing 1,008,000 elements, the molecule reader will examine all the L2 nodes to determine how many of the 70 possible L1 node labels are associated with these L2 nodes. If it is determined that there is at least one L2 node associated with each of the 70 L1 labels, the molecule reader will generate an L1 level panorama that includes full 70 L1 nodes, i.e., two molecules each having five threads, with each thread having seven nodes. If it is determined that there is less than at least one L2 node associated with each of the 70 L1 node labels, e.g., 68, the molecule reader will generate an L1 level panorama in which one thread has only five nodes.

Once the L1 level panorama has been generated, the molecule reader subsequently generates the L2 level panorama encompassed within each L1 node. For a given L1 node in the panorama, the molecule reader determines how many of the 600 possible L2 node labels are actually assigned to the L2 nodes contained in the given L1 node. If all 600 labels are found, the L2 level panorama for the given L1 node would include five L2 molecules each having ten threads, with each thread having twelve nodes. If not all 600 labels are found, then the molecule reader will generate the L2 level panorama according to the number of L2 nodes assigned to the given L1 node, and the "rules of data organization." The rules of data organization, which incorporates the size/complexity parameters specified when the database is tagged using the molecule author 301a, specifies how the L2 nodes are to be assigned to various threads and molecules. For example, if there were 121 L2 nodes contained in a given L1 node, then two possible rules of data organization would be: a) two molecules, one molecule having ten threads of twelve nodes and another molecule of one node; and b) two molecules, one molecule having five threads of twelve nodes and another molecule having five threads of twelve nodes and a sixth thread of one node.

Once the L2 level panorama has been generated, the molecule reader will then generate the L3 level panorama. For a given L2 level node, the molecule reader will read the labels of the component L3 level node and will place each node in the appropriate place in the designated thread and molecule in L3. Once again, the L3 level panorama will be determined by the "rules of data organization" contained in the molecule reader.

Figure 6:
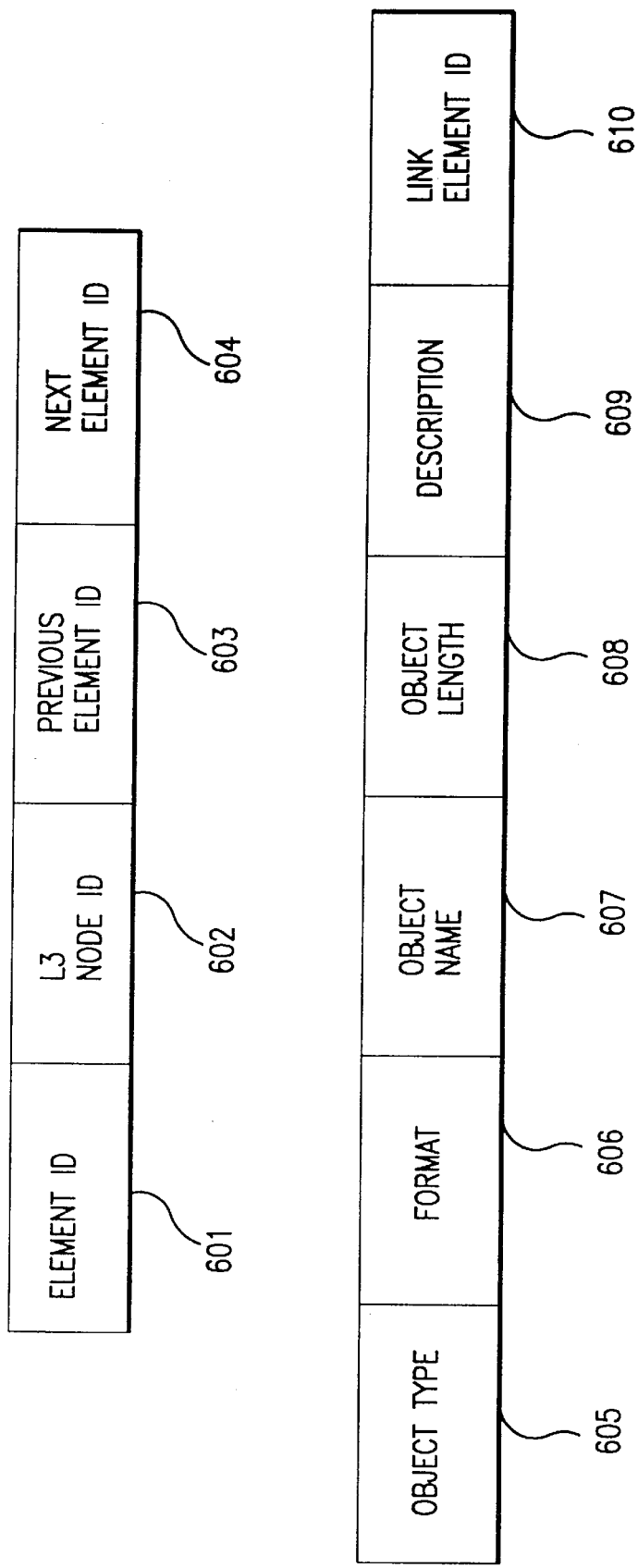
FIG. 6 is a block diagram of the data structure for an "element" unit of information.
Figure 18:
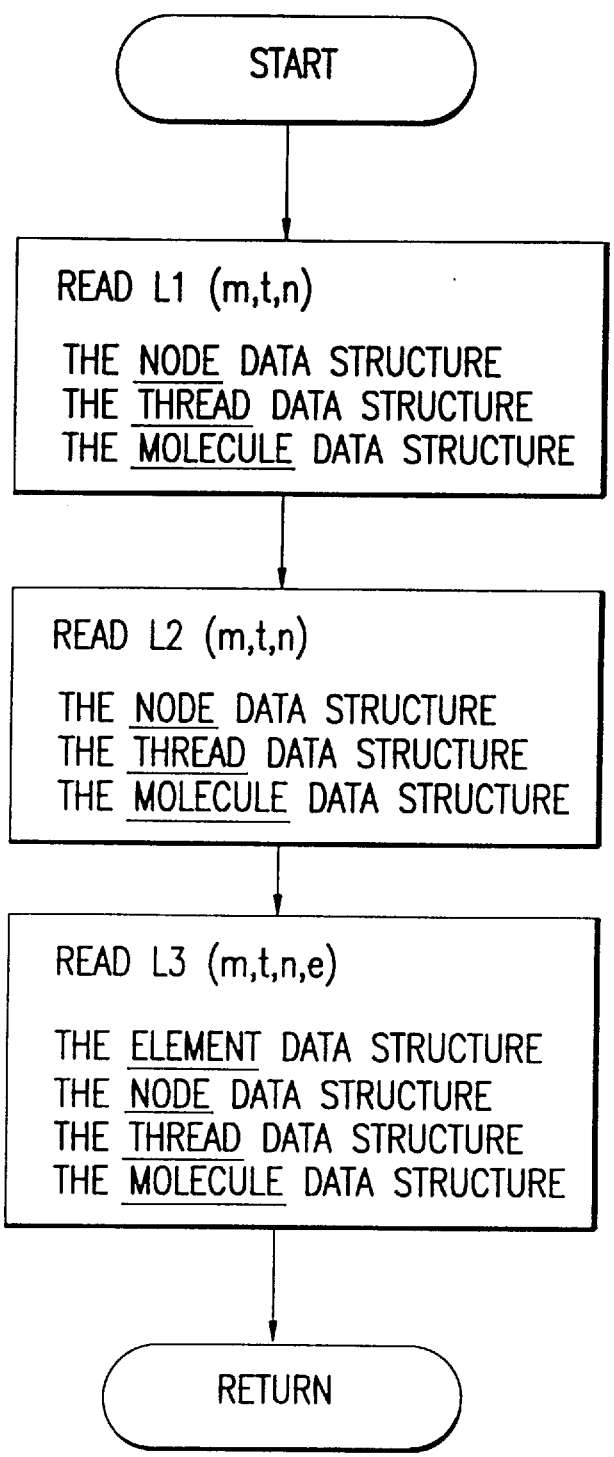
FIG. 18 is a flow chart illustrating the logic sequence for reading a "tagged" data item.

For a given element having the tag L1(m,t,n)L2(m,t,n)L3(m,t,n,e), the molecule reader will read the tag using the logic illustrated in FIG. 18. The molecule reader will first read the node, thread and molecule identifiers included in the L1(m,t,n) tag segment, then the molecule reader will repeat the step for L2(m,t,n) and L3(m,t,n,e) segments. For L3(m,t,n,e) segment, the molecule reader will also read each element's "link element ID" field 610 as shown in FIG. 6, information in which field is used to subsequently generate the appropriate graphic, cross-reference metaphor, which, depending upon the linked elements' proximity, could be a drawn as a line, a trap door, or an on-screen icon.

The process of "reading" a given element's "tag" involves processing of the data description statements by the PNS data description interpreter 303, shown in FIG. 3a, which in turn generates the PNS data map 304, also shown in FIG. 3a. As previously described, the data description statements are high-level descriptions of the organization and relationships among the component information units of a given database. The data description interpreter module 303 translates the high-level descriptions represented by the data description statements into a set of coded statements, or a coded "object," using an internally defined codes. It should be noted that, for the purposes of the data description interpreter module's reading the data description statements, the unique identifiers included in the data description statements, e.g., "element_id," "node_id," "thread_id," and "molecule_id," may be either a key word or a number.

Once again referring to the previously described example of a database of 1,008,000 elements tagged using the database description constructor 301a, the data description interpreter module 303 "reads" the individual element's L1(m,t,n)L2(m,t,n)L3(m,t,n,e) tag and performs a sorting function on each element according to the tag. Two standard sorting methods which may be employed for the above purpose are "comb" and "bubble" sorting methods, which are well known to those of ordinary skill in the art. A preferred sorting function for reading a tag of L1(m,t,n)L2(m,t,n)L3(m,t,n,e) format is illustrated in Table 12 below.

TABLE 12

SORTING FUNCTION

```
Put first element (e=1) into Temp1
Repeat for e=2 to 1,008,000
    Put e into Temp2
    If m of L1 for Temp1 < m of L1 for Temp2
        assign Temp1 to Shape 1
    else
    If m of L1 for Temp2 < m of L1 for Temp1
        assign Temp2 to Shape 1
    else
    If m of L1 for Temp1 = m of L1 for Temp2
        then go to t of L1
    If t of L1 for Temp1 < t of L1 for Temp2
        assign Temp1 to Shape 1
    else
    If t of L1 for Temp2 < t of L1 for Temp1
        assign Temp2 to Shape 1
    else
    If t of L1 for Temp1 = t of L1 for Temp2
        then go to n of L1
    If n of L1 for Temp1 < n of L1 for Temp2
        assign Temp1 to Shape 1
    else
    If n of L1 for Temp2 < n of L1 for Temp1
        assign Temp2 to Shape 1
    else
    If n of L1 for Temp1 = n of L1 for Temp2
        then go to m of L2
    Continue . . .
```

The sorting process outlined in Table 12 is repeated for each m, t, n and e variable in each L1(m,t,n)L2(m,t,n)L3(m,t,n,e) tag corresponding to one of the 1,008,000 elements. In the sorting function illustrated in Table 12, "Temp1" is a variable assigned to the first element to be sorted, and "Temp2" is a variable assigned to successive elements to be sorted. "Shape 1," which is a variable of the PNS data map 304, corresponds an algorithm which tells the presentation module 305 to render a specific, animated, three-dimensional image. A "Shape" may exist alone, but in the representative embodiment, Shape 1's algorithm works in conjunction with algorithms of other Shapes. For example, if the first molecule in level L1 has thirty-five nodes, then thirty-five Shapes will collectively constitute the portion of the data map 304 responsible for instructing the presentation module 305 to generate the first molecule in level L1. In this case, Shape 1 of Table 12 corresponds to a single node of level L1.

The above description of the process of reading a tagged database applies to any database that has been tagged using a molecule author 301a. When a database has been tagged by some other procedure, the molecule reader must search for the tags and "link element IDs" used in that particular database. Once the tags and the "link element IDs" have been discovered, the user of the molecule reader would input a selected number of tags and "link element IDs" that the user wants the molecule reader to recognize.

The data map 304 describes, in coded format, the structure and relationship of information units residing on the hypermedia database 104. The data map 304 is in turn used by the PNS presentation module 305, which is responsible for displaying the PNS "panorama" and implementing various functions and navigational features of the navigational system according to the present invention, for run-time navigation of the hypermedia database 104. The PNS data map 304 may reside on a direct access storage device as a collection of tables in the relational data base format.

The data structures of various information units, i.e., elements, nodes, threads, and molecules, as it is represented in the data map 304, correspond to the syntax of the corresponding Data Description Statements. The data structure of an L3 "element" as represented in the data map 304, which structure is shown in FIG. 6, begins with an "element ID" 601, which is a unique identifier assigned to the particular element at hand. The next component of the "element" data structure is a "L3 node ID" 602, which identifies the node to which the particular element belongs. "Previous-element ID" 603 identifies the element which precedes the particular element at hand within the presentation sequence of elements constituting the node identified by the node ID 602. "Next-element ID" 604 identifies the element which follows the particular element at hand within the presentation sequence of elements constituting the node identified by the node ID 602.

Continuing with the data structure of the "element" as shown in FIG. 6, "Object Type" component 605 specifies what type of information is contained in the element at hand, e.g., text, audio, still video, motion video, etc. "Format" component 606 identifies the format in which the element is stored. For "Object Type" that is text, the format may be, e.g., Microsoft Rich Text Format (RTF), Hypertext Markup Language (HTML), WordPerfect, Word, etc. HTML serves as scripting tags used for layout and design of Worldwide Web pages. For "Object Type" that is still video, the format may be, e.g., Windows Bitmap (BMP), Tag Image File Format (TIFF), etc. For "Object Type" that is motion video, the format may be, e.g., Microsoft Video for Windows, Apple QuickTime, MPEG, etc.

The next component of the "element" data structure is "Object Name" 607, which specifies the name of the data base object. "Object length" component 608 specifies the "length" of the element at hand, and it may be used to indicate, depending on the "Object Type" of the element: an entire file; the number of text pages; the number of video frames; the number of audio samples; or presentation duration in seconds, etc. "Description" component 609 is a description of the element at hand in the form of a character string, which may be displayed during the presentation of the element at hand. The final component of the "element" data structure is "link-element" ID field 610, which specifies the element ID(s) of one or more elements of another node containing information related to the element at hand. If the element at hand has no related information contained in another node, the link-element ID field 610 is left empty.

The data structure of an L3 "node" as represented in the data map 304, which structure is shown in FIG. 7, begins with "L3 node ID" 701, which is a unique identifier assigned to the particular node at hand. The next component, "L3 thread ID" 708, identifies the level L3 thread to which the node at hand belongs. The next component, "previous L3 node ID" 702, identifies the node which precedes the particular node at hand within the presentation sequence of nodes constituting the L3 thread to which the node at hand belongs. "Next L3 node ID" 703 identifies the node which follows the particular node at hand within the presentation sequence of nodes constituting the L3 thread to which the node at hand belongs. It should be noted that, because a thread need not solely contain a single, linear array of nodes, more than one node may be identified in each of the "previous-node ID" field 702 and the "next-node ID" field 703.

Also included in the L3 node data structure, as shown in FIG. 7, is "number of elements" 704, which indicates the number of elements included in the L3 node at hand. "First-element ID" 705 identifies the first element within the presentation sequence of elements constituting the particular L3 node at hand. "Last-element ID" 706 identifies the last element within the presentation sequence of elements constituting the particular L3 node at hand. Finally, "description" 707 includes description of the node in the form of a character string, which may be displayed during the presentation of the L3 node at hand.

The data structure of an L3 "thread" as represented in the data map 304, which structure is shown in FIG. 8, begins with "L3 thread ID" 801, which is a unique identifier assigned to the particular L3 thread at hand. The next component, "L3 molecule ID" 806, identifies the L3 molecule to which the thread at hand belongs. The next component, "number of L3 nodes" 802, specifies the number of nodes in the L3 thread at hand. The fourth component of the L3 thread data structure is "first L3 node ID" 803, which identifies the first node of the L3 thread to which the node at hand belongs. The fifth component, "last L3 node ID" 804, identifies the last node of the L3 thread to which the node at hand belongs. The last component of the thread data structure is "description" 805, which is a description of the thread at hand in the form of a character string, which may be displayed during the presentation of the L3 thread at hand.

As shown in FIG. 9, the data structure of an L3 "molecule" includes "L3 molecule ID" 901, "L2 node ID" 904, "number of L3 threads" 902, and "description" 903. "L3 molecule ID" 901 is a unique identifier assigned to the L3 molecule at hand. "L2 node ID" 904 identifies the level L2 node to which the L3 molecule at hand belongs. "Number of L3 threads" 902 specifies the number of threads in the L3 molecule at hand. "Description" 903 is a description of the molecule at hand in the form of a character string, which may be displayed during the presentation of the L3 molecule at hand.

As shown in FIGS. 10–12, the data structures of an L2 node, an L2 thread and an L2 molecule are substantially similar to the data structures of an L3 node, an L3 thread and an L3 molecule, respectively. The L2 node data structure includes "L2 node ID" 1001, "L2 thread ID" 1002, "previous L2 node ID" 1003, "next L2 node ID" 1004, "number of L3 molecules" 1005, which specifies the number of L3 molecules contained in the L2 node at hand, and "description" 1006. The L2 thread data structure includes "L2 thread ID" 1101, "L2 molecule ID" 1102, "number of L2 nodes" 1103, "first L2 node ID" 1104, "last L2 node ID" 1105 and "description" 1106. The L2 molecule data structure includes "L2 molecule ID" 1201, "L1 node ID" 1202, which specifies the L1 node to which the L2 molecule at hand belongs, "number of L2 threads" 1203 and "description" 1204.

As shown in FIGS. 13–16, the data structures of an L1 node, an L1 thread and an L1 molecule are substantially similar to the data structures of an L2 node, an L2 thread and an L2 molecule, respectively. The L1 node data structure includes "L1 node ID" 1301, "L1 thread ID" 1302, "previous L1 node ID" 1303, "next L1 node ID" 1304, "number of L2 molecules" 1305, which specifies the number of L2 molecules contained in the L1 node at hand, and "description" 1306. The L1 thread data structure includes "L1 thread ID" 1401, "L1 molecule ID" 1402, "number of L1 nodes" 1403, "first L1 node ID" 1404, "last L1 node ID" 1405 and "description" 1406. The L1 molecule data structure includes "L1 molecule ID" 1501, "panorama ID" 1502, which specifies the panorama to which the L1 molecule at hand belongs, "number of L1 threads" 1503 and "description" 1504.

As shown in FIG. 16, the panorama data structure includes "panorama ID" 1601, "number of L1 molecules" 1602, which specifies the number of L1 molecules contained in the panorama at hand, and "description" 1603.

Figure 17:
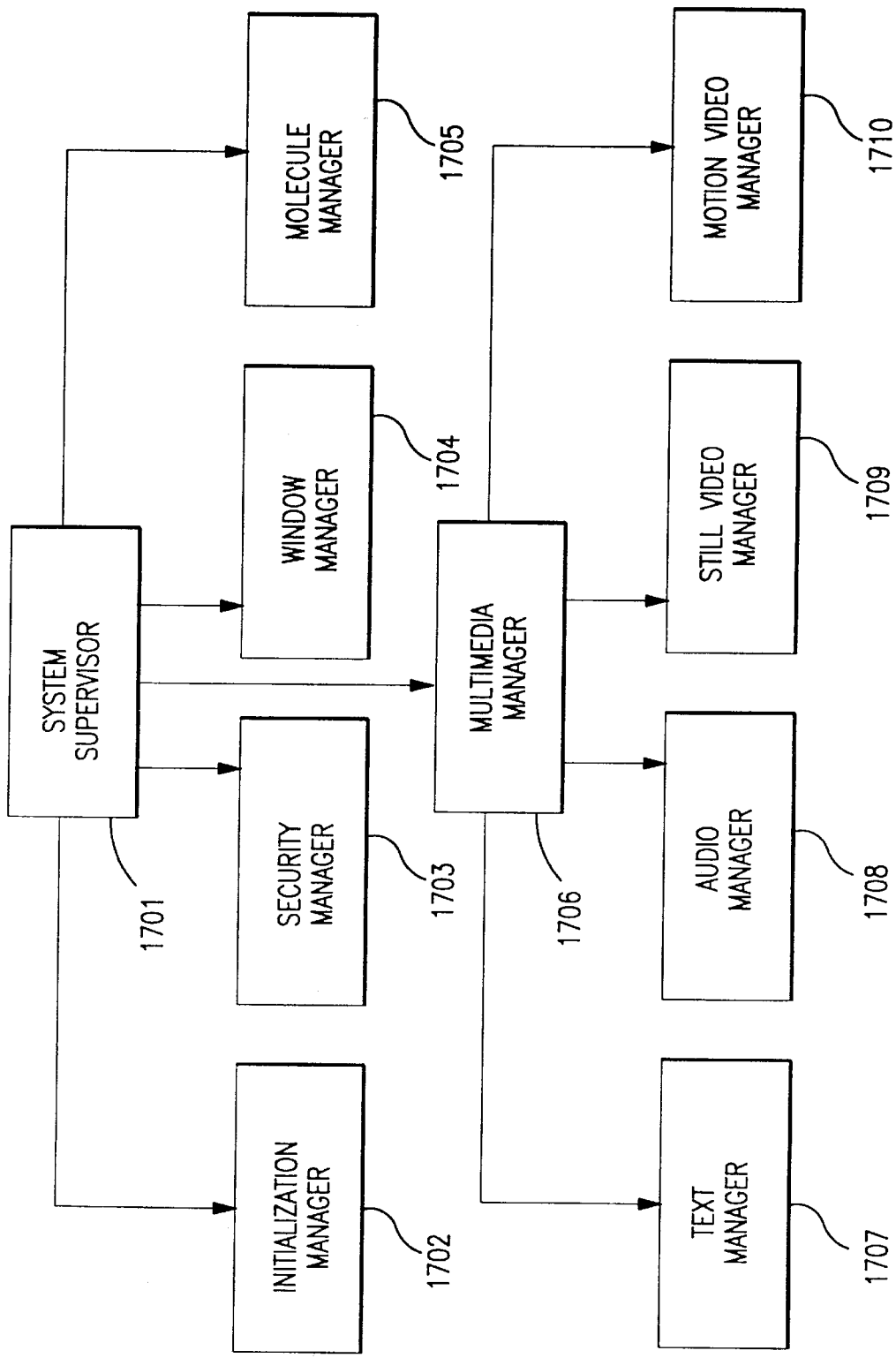
FIG. 17 is a block diagram of the structure of a presentation module according to the present invention.

As shown in FIG. 17, a representative embodiment of the presentation module 305 of the PNS software 102 includes: a system supervisor submodule 1701, an initialization manager submodule 1702, a security manager submodule 1703, a window manager submodule 1704, a molecule manager submodule 1705, a multimedia manager submodule 1706, a text manager submodule 1707, an audio manager submodule 1708, a still video manager submodule 1709, and a motion video manager submodule 1710. Pseudo code representations of the submodules 1701–1706 are found in the Appendix. The Appendix is expressly incorporated herein as part of this specification. Pseudo code representations of the submodules 1707–1710 are not shown, as these submodules may be readily implemented by utilizing commercially available programs, and the actual implementation will be readily apparent to those of ordinary skill in the art.

As shown in FIG. 17 and the Appendix, the system supervisor submodule 1701 calls on the submodules 1702–1705 to: perform system start-up; check user sign-on ID; set up the window area for displaying the molecules; and generate the molecules for display. The multimedia manager submodule 1706 calls on one of the submodules 1707–1710 depending on whether the selected element contains text, audio, still video or motion video, respectively.

The following is one example illustrating a use of the present invention. The World Wide Web of the Internet comprises many pages of information. Each page can include, for example, text, graphics, links to other web pages, links to sound files, links to graphics files and links to video files. The present invention can create a data map representing preselected web pages and the interrelationships between such pages. For example, at the lowest level, each node could represent one web page (or even part of a web page, such as a graphics segment or a sound segment). Threads would represent the links between related web pages. When the user selects a node, the web page is displayed.

The web pages that are represented by the nodes of the present invention could be preselected by a third party. The molecule(s) representing these web pages could be supplied to a user. Thus, the third party could create a molecule representing the relationship between preselected web pages on a particular topic, e.g., constitutional law or southern cooking. Alternatively, the data map could be created "on-the-fly" as the user navigates the World Wide Web, representing the web pages accessed by the user.

Accordingly, the present invention could easily be integrated into existing browser programs to illustrate paths that the user may wish to follow through the World Wide Web or paths that the user has previously navigated through the World Wide Web.

The present invention accommodates a hierarchy of three dimensional molecules, e.g., a molecule for law where each thread represents a category of law (e.g., tax law, constitutional law, patent law, etc.) and each node represents a year. If the user selects a node, another three dimensional molecule is displayed representing developments, cases, and articles in that category of law for that year, where each node represents a web site (or other unit of information).

The same principles discussed in this example also apply to Intranet web pages, multimedia encyclopedias, interactive and electronic books and the like.

While the present invention has been described in connection with the foregoing representative embodiments, it should be readily apparent to those of ordinary skill in the art that the representative embodiments are exemplary in nature and are not to be construed as limiting the scope of protection for the invention as set forth in the appended claims. For example, while the representative embodiments represent a database by using a "molecule" having multiple nodes, other structural forms, such as a box, having component part designated by alternative shapes, such as triangles and cubes, may be used to represent the database. Furthermore, while the representative embodiments utilize specific data structures for elements, nodes, threads, molecules and panoramas, other data structures will be readily apparent to those of ordinary skill in the art. Still yet, while the exemplary hierarchical organization of the database designated the "first level," L1, as the most generic hierarchical level of organization, the level designations may be altered such that the "first level" refers to the most specific level of organization. In addition, while the "comb" and "bubble" sorting methods have been presented as the two standard sorting methods which may be applied in the representative embodiments of the present invention, other methods will be readily apparent to those of ordinary skill in the art.

DOCKET NO. 2385/1

APPENDIX

PRESENTATION MODULE PSEUDO CODE (comment lines begin with "//")

1. System Supervisor Submodule

```
Start
// call Initialization Manager to perform system startup
// initialization
InitializationManager(Start)

If ERROR return code
    record error information
    display error message
    terminate
EndIf // user signon
SecurityManager(Signon)

If NOT_AUTHORIZED or ERROR return code
    display error message
    terminate
EndIf // create PNS window
WindowManager(CreateWindow)

If ERROR return code
    record error information
    display error message
    terminate
EndIf // select presentation
read presentation list for USER_ID
display presentation selection dialog
read presentation selection
set PresentationObject name // call Initialization Manager to initialize presentation
InitializationManager(InitializePresentation,
PresentationObject)

// create initial PNS molecule
MoleculeManager(CreateInitial, PresentationObject)

If ERROR return code
    record error information
    display error message
```

```
        terminate
EndIf

// display PNS molecule
WindowManager(DisplayMolecule)

// process user input
WindowManager(ProcessUserInput)

// window manager returned because the user requested
// system termination

Release storage
Record system termination status
Terminate

2.   Initialization Manager Submodule

// commands accepted:    Start
//                       InitializePresentation

If Start command

Obtain system work areas

If no storage
        return(ERROR)
    EndIf

Initialize system work areas return(NORMAL)
EndIf

If InitializePresentation command

Open Data Base Map

Locate PresentationObject

Allocate memory for PresentationObjectControlBlock

Set PresentationObjectControlBlock from the
    PresentationObject

Store 1 to CurrentThreadCount

Point to the first ThreadObject in the
    PresentationObject
```

DOCKET NO. 2385/1

```
While (CurrentThreadCount <
PresentationObjectThreadCount)

Allocate memory for ThreadObjectControlBlock

Set forward link pointer in
    ThreadObjectControlBlock

Set backward link pointer in
    ThreadObjectControlBlock

Set ThreadObjectControlBlock from the
    ThreadObject

// create node list for the thread
    CreateThreadNodeList(ThreadObject)

// process the next ThreadObject
    Add 1 to CurrentThreadCount

Point to the next ThreadObject in the
    PresentationObject

EndWhile

CreateThreadNodeList:
// ThreadObject is passed

Store 1 to CurrentNodeCount
Point to the first NodeObject in the ThreadObject

While (CurrentNodeCount < ThreadObjectNodeCount)

Allocate memory for NodeObjectControlBlock

Set forward link pointer in
    NodeObjectControlBlock

Set backward link pointer in
    NodeObjectControlBlock

Set NodeObjectControlBlock from the NodeObject

// create node linked list for the thread
    Create NodeElementList(NodeObject)

// process the next NodeObject
    Add 1 to CurrentNodeCount
    Point to the next NodeObject in the ThreadObject EndWhile
```

-76-

DOCKET NO. 2385/1

```
CreateNodeElementList:
// NodeObject is passed

Store 1 to CurrentElementCount
Point to the first ElementObject in the NodeObject While (CurrentElementCount < NodeObjectElementCount)

Allocate memory for ElementObjectControlBlock

Set forward link pointer in
        ElementObjectControlBlock

Set backward link pointer in
        ElementObjectControlBlock

Set ElementObjectControlBlock from the
        ElementObject

// process the next ElementObject
        Add 1 to CurrentElementCount

Point to the next ElementObject in the
        ThreadObject

EndWhile

3.   Security Manager Submodule

Start

Obtain work areas

If no storage
    return(ERROR)
EndIf

Store 1 to CurrentSignonRetry while (CurrentSignonRetry < MaxSignonRetry)

Display signon dialog

Read USER_ID and PASSWORD

Search security file for USER_ID record

If USER_ID found and match on PASSWORD
              return(NORMAL)
      Else
```

DOCKET NO. 2385/1

```
        Add 1 to CurrentRetry
    EndIf

EndWhile return(NOT_AUTHORIZED)

4.  Window Manager Submodule

// commands accepted:    CreateWindow
//                       DisplayMolecule
//                       ProcessUserInput If CreateWindow command
    Obtain work areas If no storage
        return(ERROR)
    EndIf // read window parameters
    Read window size(x, y)
    Read window position(x, y)
    Create window
    Display window
    return(NORMAL)
EndIf If DisplayMolecule command
    Point to PresentationObject
    // call the molecule manager
    MoleculeManager(CreateMolecule, PresentationObject)
    Display molecule in PNS window
    return(NORMAL)
EndIf If ProcessUserInput command UserInputLoop:

wait for user input

// user input (e.g., a mouse click) received
    get input coordinates(x, y)

if input coordinates within some node icon
    coordinates set SelectedNodeObject to NodeObjectControlBlock
        selected
```

-78-

DOCKET NO. 2385/1

```
        ProcessNode(SelectedNodeObject)

Loop
    EndIf if (input coordinates) within (link icon
    coordinates)

set SelectedNodeObject to linked
        NodeObjectControlBlock

ProcessNode(SelectedNodeObject)

Loop
    EndIf

EndLoop

ProcessNode:
// NodeObjectControlBlock is passed if node in foreground thread
    PresentNode(NodeObjectControlBlock)
EndIf if node in background thread
    // the node is in the background thread, bring the
    // thread foreground // call the molecule manager to set the new foreground
    // thread
    MoleculeManager(PresentationObjectControlBlock,
                    TheadObjectControlBlock,
                    NodeObjectControlBLock)

// display the molecule with the new foreground thread
    refresh window
    PresentNode(NodeObjectControlBlock)
return(NORMAL)

PresentNode:
// NodeObjectControlBlock is passed

// the node is in the current foreground thread, modify
// the node icon appearance to indicate active node
SetIconColor(NodeObjectControlBlock, ActiveIconColor)
refresh window // present the node requested
MultimediaManager(NodeObjectControlBlock)
return(NORMAL)
```

-79-

DOCKET NO. 2385/1

5. Molecule Manager Submodule

```
// create the PNS molecule
// parameters passed:    PresentationObjectControlBlock
//                       ThreadObjectControlBlock
//                       NodeObjectControlBLock Obtain work areas If no storage
    return(ERROR)
EndIf Read system parameters:
    PNS window size(x, y)
    node icon size(x, y)
    display device resolution CalculateNumberOfThreads(WindowSizeX, WindowSizeY,
                        NodeIconSizeX, NodeIconSizeY,
                        DisplayDeviceResolution)

Set 1 to CurrentThreadCount while CurrentThreadCount < CalculatedNumberOfThreads SetCurrentThreadCoordinates(x, y)

set 1 to CurrentNodeCount while CurrentNodeCount < ThreadNodeCount
        SetCurrentNodeCoordinates(x, y)
        CreateNodeIcon(NodeObjectControBlock, x, y)
        add 1 to CurrentNodeCount
    EndWhile add 1 to CurrentThreadCount EndWhile
```

6. Multimedia Manager Submodule

```
// present data base object
// parameters passed:    NodeObjectControlBLock

Obtain work areas

If no storage
    return(ERROR)
EndIf
```

-80-

DOCKET NO. 2385/1

```
set 1 to CurrentElementCount while CurrentElementCount < NodeElementCount

// call a browser depending on the element type if ElementType = Text
       TextBrowser(ElementObjectControlBlock)
    EndIf if ElementType = Audio
       AudioBrowser(ElementObjectControlBlock)
    EndIf if ElementType = StillVideo
       StillVideoBrowser(ElementObjectControlBlock)
    EndIf if ElementType = MotionVideo
       MotionVideoBrowser(ElementObjectControlBlock)
    EndIf add 1 to CurrentElementCount EndWhile
```

We claim:

1. An interface system for presenting on a monitor of a computer system a dynamic, graphic representation of organization of one of a portion of information and entire information within an information base, said entire information within said information base being organized into at least first hierarchical level having at least a plurality of first-sublevel information units, a plurality of second-sublevel information units, and at least one third-sublevel information unit, each of said first-sublevel, second-sublevel and third-sublevel information units having an identifier, each of said second-sublevel information units comprising at least one first-sublevel information unit, said at least one third-sublevel information unit comprising a plurality of said second-sublevel information units, said dynamic, graphic representation implying a specific search path that a user may take in examining said available information, said interface system comprising:

means for generating a coded data map reflecting said organization of said entire information within said information base based at least on said identifiers for each of said first-sublevel, second-sublevel and third-sublevel information units; and means for presenting on said monitor said dynamic, graphic representation of said organization of said one of said portion of information and said entire information within said information base, said graphic presentation means generating said dynamic graphic representation based on said data map, said dynamic graphic representation comprising at least one molecule for said first hierarchical level of organization, said at least one first-hierarchical-level molecule having at least one first-hierarchical-level thread of multiple first-hierarchical-level nodes connected in sequence, each of said multiple first-hierarchical-level nodes representing one of said plurality of second-sublevel information units, and said at least one first-hierarchical-level thread representing said at least one third-sublevel information unit;

wherein said sequence of first-hierarchical-level nodes in said at least one first-hierarchical-level thread corresponds to an organization of said at least one third-sublevel information unit.

2. The interface system according to claim 1, wherein said organization of said at least first hierarchical level further comprises at least one fourth-sublevel information unit corresponding to said at least one first-hierarchical-level molecule, and wherein each of said second-sublevel information units corresponds to a first information subject area, said at least one third-sublevel information unit corresponds to a second information subject area which encompasses said first information subject area, and said at least one fourth-sublevel information unit corresponds to a third information subject area which encompasses said second information subject area.

3. The interface system according to claim 2, wherein said at least one fourth-sublevel information unit has an identifier, and wherein said coded-data-map generating means generates said coded data map based on said identifiers for said first-sublevel, second-sublevel, third-sublevel and fourth-sublevel information units.

4. The interface system according to claim 3, wherein:

said computer system further comprises an input unit for enabling the user to interact with said graphic representation, said input unit enabling the user to select a desired first-hierarchical-level node to be examined;

wherein said graphic presentation means dynamically alters said graphic representation provided on said monitor in response to control command provided by said user via said input unit, whereby said graphic representation comprises a three-dimensional image;

and wherein said sequence of first-hierarchical-level nodes in said at least one first-hierarchical-level thread corresponds to an implied search path for the user of said interface system.

5. The interface system according to claim 4, wherein said input unit further enables said user to change said organization of said one of said portion of information and said entire information within said information base as reflected in said data map.

6. The interface system according to claim 5, wherein said interface system enables said user to copy, by means of said input unit, said organization of said one of said portion of information and said entire information within said information base as reflected in said data map by copying one of a corresponding portion of said graphical representation and said entire graphical representation, whereby said copy of said organization of said one of said portion of information and said entire information within said information base is incorporated as an addition to said organization of said entire information within said information base as reflected in said data map.

7. The interface system according to claim 2, wherein said entire information within said information base is organized into a second hierarchical level and said first hierarchical level, said second hierarchical level having a plurality of fifth-sublevel information units, at least one sixth-sublevel information unit, and at least one seventh-sublevel information unit, wherein each of said fifth-sublevel information units comprises at least one unique fourth-sublevel information unit corresponding to one unique first-hierarchical-level molecule, and wherein said dynamic, graphic representation provided by said graphic presentation means further comprises at least one molecule for said second hierarchical level, said at least one second-hierarchical-level molecule having at least one second-hierarchical-level thread of multiple second-hierarchical-level nodes connected in sequence, said at least one second-hierarchical-level molecule corresponding to said at least one seventh-sublevel information unit, and said at least one second-hierarchical-level thread corresponding to said at least one sixth-sublevel information unit, and each of said second-hierarchical-level nodes corresponding to one of said plurality of fifth-sublevel information units.

8. The interface system according to claim 7, wherein each of said plurality of fifth-sublevel information units, said at least one sixth-sublevel information unit and said at least one seventh-sublevel information unit has an identifier, and wherein said coded-data-map generating means generates said coded data map based on said identifiers for said first-sublevel information units through said seventh-sublevel information unit.

9. The interface system according to claim 8, wherein:

said computer system further comprises an input unit for enabling the user to interact with said graphic representation, said input unit enabling the user to select one of said multiple first-hierarchical-level nodes and one of said multiple second-hierarchical-level nodes to be examined;

wherein said graphic presentation means dynamically alters said graphic representation provided on said monitor in response to control command provided by said user via said input unit, whereby said graphic representation comprises a three-dimensional image;

and wherein said sequence of nodes in said at least one second-hierarchical-level thread corresponds to an organization of said at least one sixth-sublevel information unit, and wherein said sequence of nodes in said at least one second-hierarchical-level thread corresponds to an implied search path for the user of said interface system.

10. The interface system according to claim 9, wherein said input unit further enables said user to change said organization of said one of said portion of information and said entire information within said information base as reflected in said data map.

11. The interface system according to claim 10, wherein said system enables said user to copy, by means of said input unit, said organization of said one of said portion of information and said entire information within said information base as reflected in said data map by copying one of a corresponding portion of said graphical representation and said entire graphical representation corresponding, whereby said copy of said organization of said one of said portion of information and said entire information within said information base is incorporated as an addition to said organization of said entire information within said information base as reflected in said data map.

12. The interface system according to claim 4 further comprising:
means for generating a graphical menu, said graphical menu enabling said user of said interface to assign said identifiers for said first-sublevel through fourth-sublevel information units.

13. The interface system according to claim 6, wherein said organization of said at least first hierarchical level further comprises a plurality of said third-sublevel information units, and wherein each identifier corresponding to one of a selected number of said plurality of first-sublevel information units comprises information regarding location of a related first-sublevel information unit contained in a different third-sublevel information unit, and wherein said graphic representation further comprises a plurality of threads corresponding to said plurality of said third-sublevel information units and icons indicating related first-hierarchical-level nodes which are contained in different threads.

14. The interface system according to claim 13, wherein said input unit enables said user to jump between related first-sublevel information units which are contained in different third-sublevel information units by selecting said icons indicating related first-hierarchical-level nodes which are contained in different threads.

15. The interface system according to claim 9, wherein said graphic presentation means provides on said monitor said dynamic, graphic representation comprising said at least one second-hierarchical-level molecule and said one unique first-hierarchical-level molecule corresponding to said one unique fourth-sublevel information unit contained in a fifth-sublevel information unit corresponding to a second-hierarchical-level node selected by said user.

16. The interface system according to claim 9, further comprising:
means for generating a graphical menu, said graphical menu enabling said user of said interface to assign said identifiers for said first-sublevel through seventh-sublevel information units.

17. A computer-readable memory device containing a program for presenting a dynamic, graphic representation, on a display device of a computer, of organization of information available within an information base, said available information being defined into at least one first-level information unit corresponding to a concept, said at least one first-level information unit comprising a plurality of second-level information units corresponding to different categories of said concept, each of said second-level information units comprising a plurality of third-level information units corresponding to subcategories of each of said different categories, each of said first-level, second-level and third-level information units having an identifying label, said dynamic, graphic representation implying a specific search path enabling a user to interact with, and navigate through, said available information, said computer further comprising a processor and an input device for accepting user commands, said memory device comprising:

means for reading said identifying label of each of said first-level, said second-level and said third-level information units;

means for generating a set of relationships describing organizational relationships among said first-level, said second-level and said third-level information units; and a graphic presentation means for displaying a dynamic, graphic representation of said organizational relationships among said first-level, said second-level and said third-level information units, said dynamic graphic representation comprising, for each of said second-level information units, a substantially linear arrangement of icons representing said plurality of third-level information units contained in the corresponding second-level information unit;

wherein said arrangement of said third-level information unit icons reflects an organization of the corresponding second-level information unit.

18. The computer-readable memory device according to claim 17, wherein said dynamic graphic representation further comprises at least one molecule having a plurality of threads, said at least one molecule corresponding to said at least one first-level information unit, and said plurality of threads corresponding to said plurality of second-level information units.

19. A method of presenting a dynamic, graphic representation of organization of information contained in a database so as to enable a user of said database to interact with, and navigate through, said information contained in said database by interacting with said dynamic, graphic representation, said information contained in said database being organized into at least first hierarchical level having at least one first-sublevel information unit corresponding to a concept, said at least one first-sublevel information unit comprising a plurality of second-sublevel information units corresponding to different categories of said concept, each of said second-sublevel information units comprising a plurality of third-sublevel information units corresponding to subcategories of each of said different categories, each of said first-sublevel, second-sublevel and third-sublevel information units having associated therewith an identifying label, which method comprises:

reading said identifying labels of said first-sublevel, said second-sublevel and said third-sublevel information units;

generating, based on said identifying labels of said first-sublevel, said second-sublevel and said third-sublevel information units, a data map describing organizational relationships among said first-sublevel, said second-sublevel and said third-sublevel information units; and generating a dynamic, graphic representation of said organizational relationships among said first-sublevel, said second-sublevel and said third-sublevel information units, said dynamic graphic representation comprising at least one molecule having a plurality of threads, each of said plurality of threads comprising a plurality of ordered nodes, said at least one molecule corresponding to said at least one first-sublevel information unit, said plurality of threads corresponding to said plurality of second-sublevel information units, and said plurality of nodes corresponding to said plurality of third-sublevel information units.

20. The method according to claim 19, wherein said step of generating said dynamic, graphic representation further comprises generating link-node icons indicating related nodes which are contained in different threads.

21. The method according to claim 19, further comprising the step of:

dynamically altering said graphic representation in response to a new selection of one of said plurality of nodes by said user, whereby said graphic representation comprises a dynamically oriented, three-dimensional image of said at least one molecule.

22. The method according to claim 20, further comprising the step of:

dynamically altering said graphic representation in response to a new selection of one of said plurality of nodes and said link-node icons by said user, whereby said graphic representation comprises a dynamically oriented, three-dimensional image of said at least one molecule.

23. The method according to claim 22, wherein said information contained in said database is organized into said first hierarchical level and a second hierarchical level, said second hierarchical level having at least one fourth-sublevel information unit, said at least one fourth-sublevel information unit comprising a plurality of fifth-sublevel information units, each of said fifth-sublevel information units comprising a plurality of sixth-sublevel information units, each of said plurality of sixth-sublevel information units comprising said at least one first-sublevel information unit, each of said fourth-sublevel, fifth-sublevel and sixth-sublevel information units having associated therewith an identifying label, and wherein:

said step of reading said identifying labels further comprises reading said identifying labels of said fourth-sublevel, said fifth-sublevel and said sixth-sublevel information units;

said step of generating said data map comprises generating, based on said identifying labels of said first-sublevel, said second-sublevel, said third-sublevel, said fourth-sublevel, said fifth-sublevel and said sixth-sublevel information units, a data map describing organizational relationships among said first-sublevel, said second-sublevel, said third-sublevel, said fourth-sublevel, said fifth-sublevel and said sixth-sublevel information units; and said step of generating said dynamic, graphic representation comprises generating a dynamic, graphic representation of said organizational relationships among said first-sublevel, said second-sublevel, said third-sublevel, said fourth-sublevel, said fifth-sublevel and said sixth-sublevel information units, said dynamic graphic representation further comprising at least one second-hierarchical-level molecule having a plurality of second-hierarchical-level threads, each of said plurality of second-hierarchical-level threads comprising a plurality of second-hierarchical-level nodes, said at least one second-hierarchical-level molecule corresponding to said at least one fourth-sublevel information unit, said plurality of second-hierarchical-level threads corresponding to said plurality of fifth-sublevel information units, and said plurality of second-hierarchical-level nodes corresponding to said plurality of sixth-sublevel information units.

24. A method of presenting on a monitor of a computer system a dynamic, graphic representation of organization of information contained in a database so as to enable a user of said database to interact with, and navigate through, said information contained in said database by interacting with said dynamic, graphic representation, said information contained in said database being organized into at least first hierarchical level having a plurality of sublevels, said plurality of sublevels being hierarchically imbedded, each of said sublevels having one of at least one and a plurality of information units, each of said information units in all sublevels having associated therewith an identifying label, which method comprises:

reading said identifying labels of said information units for all sublevels;

generating, based on said identifying labels of said information units for all sublevels, a data map describing organizational relationships among said information units for all sublevels; and generating a dynamic, graphic representation of said organizational relationships among said information units for all sublevels, said dynamic graphic representation comprising at least one thread having a plurality of nodes arranged in sequence.

25. The method according to claim 24, further comprising the steps of:

presenting information contained in a first information unit corresponding to a first one of said plurality of nodes selected by means of a user's selection input; and in the absence of further selection input, sequentially presenting information units corresponding to a sequence of nodes beginning a second one of said plurality of nodes immediately following said first one of said plurality of nodes.

26. The method according to claim 25, wherein said graphic representation comprises a plurality of threads, said method further comprising the step of:

dynamically altering said graphic representation provided on said monitor in response to said user's selection input, whereby said graphic representation comprises a dynamic, three-dimensional image of said plurality of threads.

27. The method according to claim 26, wherein said dynamic, three-dimensional image of said plurality of threads comprises at least one molecule having at least two of said plurality of threads.

28. An interface system for presenting on a monitor of a computer system a dynamic, graphic representation of organization of information contained in a database so as to enable a user of said database to interact with, and navigate through, said information contained in said database by interacting with said dynamic, graphic representation by selectively inputting a selection input via an input unit of said computer system, said information contained in said database being organized into at least first hierarchical level having a plurality of sublevels, said plurality of sublevels being hierarchically imbedded, each of said sublevels having one of at least one and a plurality of information units, each of said information units in all sublevels having associated therewith an identifying label, which interface system comprises:

means for reading said identifying labels of said information units for all sublevels;

means for generating, based on said identifying labels of said information units for all sublevels, a data map describing organizational relationships among said information units for all sublevels; and means for generating a dynamic, graphic representation of said organizational relationships among said information units for all sublevels, said dynamic graphic representation comprising at least one thread having a plurality of nodes arranged in sequence.

29. The interface system according to claim 28, wherein information contained in a first information unit corresponding to a first one of said plurality of nodes selected by means of said user's selection input is presented on said computer monitor, and wherein, in the absence of further selection input, information units corresponding to a sequence of nodes beginning with a second one of said plurality of nodes immediately following said first one of said plurality of nodes are sequentially presented on said computer monitor.

30. The interface system according to claim 29, wherein said graphic representation comprises a plurality of threads, and wherein said graphic-representation generating means dynamically alters said graphic representation provided on said monitor in response to said user's selection input, whereby said graphic representation comprises a dynamic, three-dimensional image of said plurality of threads.

31. The interface system according to claim 30, wherein said dynamic, three-dimensional image of said plurality of threads comprises at least one molecule having at least two of said plurality of threads.

32. For use in a computer system having an information base organized into units of information, a graphical user interface generator executed by a processor comprising:

means for selecting from the information base a plurality of units of information;

means for creating a hierarchical data map representing the selected units of information;

a presentation module for reading the data map and displaying the data map in a three dimensional representation as one or more molecules, each molecule comprising a plurality of threads, each thread comprising a plurality of ordered nodes, each ordered node representing a unit of information in the information base;

first user controlled means for rotating the one or more molecules so that the one or more molecules are displayed from different perspectives; and second user controlled means for selecting one of the plurality of ordered nodes to cause to be output the unit of information represented by said selected node.

33. The graphical user interface generator of claim 32 wherein the means for selecting further comprises means for automatically selecting a plurality of units of information as a user traverses the information base.

34. The graphical user interface generator of claim 33 wherein the hierarchical data map represents a path taken by the user as the user traverses the information base.

35. The graphical user interface generator of claim 32 wherein the information base is a multimedia encyclopedia.

36. The graphical user interface generator of claim 32 wherein the information base is a plurality of interrelated web pages.

37. The graphical user interface generator of claim 32 wherein the information base is a relational database.

38. The graphical user interface generator of claim 32 wherein the hierarchical data map is stored in a memory device of the computer system.

39. The graphical user interface generator of claim 32 wherein the one or more molecules are displayed on a first portion of a screen of the computer system and the unit of information represented by said selected node is simultaneously displayed on a second portion of the screen.

40. The graphical user interface generator of claim 32 wherein the one or more molecules are displayed on a portion of a screen of the computer system and the unit of information represented by said selected node is simultaneously output by the computer system.

41. The graphical user interface generator of claim 32 further comprising means for visually identifying the plurality of ordered nodes selected according to the second user controlled means.

42. For use in a computer system having a processor, a memory and an information base organized into a plurality of information units, a computer-implemented graphical user interface system comprising:

a hierarchical data map stored in memory representing preselected information units of the information base;

a presentation module for reading the data map and displaying the data map in a three dimensional representation as one or more molecules, each molecule comprising a plurality of threads, each thread comprising a plurality of ordered nodes, each ordered node representing an information unit in the information base;

first user controlled means for selecting and rotating one of the one or more molecules so that the selected molecule is displayed from a different perspective; and second user controlled means for selecting one of the plurality of ordered nodes to cause to be output the information unit represented by said selected node.

43. The graphical user interface system of claim 42 wherein the presentation modules displays a complete three-dimensional view of one of the one or more molecules.

44. The graphical user interface system of claim 42 wherein there is a hierarchical relationship between each of the one or more molecules.

45. The graphical user interface system of claim 42 wherein the information base is a multimedia encyclopedia.

46. The graphical user interface system of claim 42 wherein the information base is a plurality of interrelated web pages.

47. The graphical user interface system of claim 42 wherein the information base is a relational database.

48. The graphical user interface system of claim 42 wherein the one or more molecules are displayed on a first portion of a screen of the computer system and the information unit represented by said selected node is simultaneously displayed on a second portion of the screen.

49. The graphical user interface system of claim 42 wherein the one or more molecules are displayed on a portion of a screen of the computer system and the information unit represented by said selected node is simultaneously output by the computer system.

50. A computer controlled method for organizing and controlling the display of information units stored in an information base, the method comprising the steps of:

providing a hierarchical data map representing preselected information units of the information base;

reading the data map;

displaying the data map to a user in a three dimensional representation as one or more molecules, each molecule comprising a plurality of threads, each thread comprising a plurality of ordered nodes, each ordered node representing an information unit in the information base;

enabling the user to select and rotate one of the one or more molecules so that the selected molecule is displayed from a different perspective; and enabling the user to select one of the plurality of ordered nodes to cause to be output the information unit represented by said selected node.

51. The method of claim 50 further comprising the initial step of creating a hierarchical data map representing preselected information units of the information base.

52. The method of claim 50 further comprising the initial steps of:

selecting from the information base a plurality of information units; and creating a hierarchical data map representing the selected information units.

53. The method of claim 50 wherein the information base is a multimedia encyclopedia.

54. The method of claim 50 wherein the information base is a plurality of web pages on the Internet.

55. The method of claim 50 wherein the information base is a relational database.

* * * * *